(12) United States Patent
Stenger et al.

(10) Patent No.: US 10,832,437 B2
(45) Date of Patent: Nov. 10, 2020

(54) METHOD AND APPARATUS FOR ASSIGNING IMAGE LOCATION AND DIRECTION TO A FLOORPLAN DIAGRAM BASED ON ARTIFICIAL INTELLIGENCE

(71) Applicant: Rakuten, Inc., Tokyo (JP)

(72) Inventors: Bjorn Stenger, Tokyo (JP); Tomoyuki Mukasa, Tokyo (JP); Jiu Xu, Tokyo (JP); Lu Yan, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 87 days.

(21) Appl. No.: 16/121,633

(22) Filed: Sep. 5, 2018

(65) Prior Publication Data
US 2020/0074668 A1   Mar. 5, 2020

(51) Int. Cl.
| | | |
|---|---|---|
| G06T 7/70 | (2017.01) | |
| G06K 9/62 | (2006.01) | |
| G06T 7/00 | (2017.01) | |
| G06T 19/20 | (2011.01) | |
| G06T 1/20 | (2006.01) | |
| G06T 1/60 | (2006.01) | |
| G06N 3/08 | (2006.01) | |

(52) U.S. Cl.
CPC ............ *G06T 7/70* (2017.01); *G06K 9/6203* (2013.01); *G06N 3/08* (2013.01); *G06T 1/20* (2013.01); *G06T 1/60* (2013.01); *G06T 7/0002* (2013.01); *G06T 19/20* (2013.01); *G06T 2207/20041* (2013.01); *G06T 2219/2004* (2013.01); *G06T 2219/2016* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,117,558 | B2 * | 2/2012 | Hoguet | G06Q 30/0601 715/779 |
| 8,122,370 | B2 * | 2/2012 | Hoguet | G06Q 30/0601 715/779 |
| 10,192,115 | B1 * | 1/2019 | Sheffield | G06N 20/00 |
| 10,225,492 | B1 * | 3/2019 | Steffanson | G06N 20/00 |
| 10,297,070 | B1 * | 5/2019 | Zhu | G06T 17/00 |
| 10,438,164 | B1 * | 10/2019 | Xiong | G06K 9/78 |
| 2009/0160856 | A1 * | 6/2009 | Hoguet | G06T 17/00 345/420 |
| 2010/0073363 | A1 * | 3/2010 | Densham | G06K 9/00624 345/419 |
| 2014/0055560 | A1 * | 2/2014 | Fu | G06T 7/40 348/42 |

(Continued)

FOREIGN PATENT DOCUMENTS

| | | |
|---|---|---|
| JP | 2017041149 A | 2/2017 |
| JP | 2018081548 A | 5/2018 |

*Primary Examiner* — Tsung Yin Tsai
(74) *Attorney, Agent, or Firm* — HEA Law PLLC

(57) ABSTRACT

A computer implemented method using artificial intelligence for matching images with locations and directions by acquiring a plurality of panoramic images, detecting objects and their locations in each of the panoramic images, acquiring a floorplan image, detecting objects and their locations in the floorplan image, comparing the objects and locations detect in each of the panoramic image to the objects and locations detected in the floorplan image, and determining a location in the floorplan image where each panoramic image was taken.

20 Claims, 30 Drawing Sheets

(56) References Cited

U.S. PATENT DOCUMENTS

| | | | |
|---|---|---|---|
| 2018/0089763 A1* | 3/2018 | Okazaki | G06F 16/51 |
| 2018/0137642 A1* | 5/2018 | Malisiewicz | G06K 9/00201 |
| 2018/0149481 A1 | 5/2018 | Hirai | |
| 2018/0268220 A1* | 9/2018 | Lee | G06K 9/627 |
| 2018/0315162 A1* | 11/2018 | Sturm | H04N 13/239 |
| 2019/0005719 A1* | 1/2019 | Fleischman | G06T 7/73 |
| 2019/0035100 A1* | 1/2019 | Ebrahimi Afrouzi | G06T 7/13 |
| 2019/0147341 A1* | 5/2019 | Rabinovich | G06N 3/08 |
| | | | 382/156 |
| 2019/0266293 A1 | 8/2019 | Ishida et al. | |
| 2019/0318502 A1* | 10/2019 | He | G06N 3/08 |
| 2019/0340433 A1* | 11/2019 | Frank | G06T 7/254 |

\* cited by examiner

FIG. 3
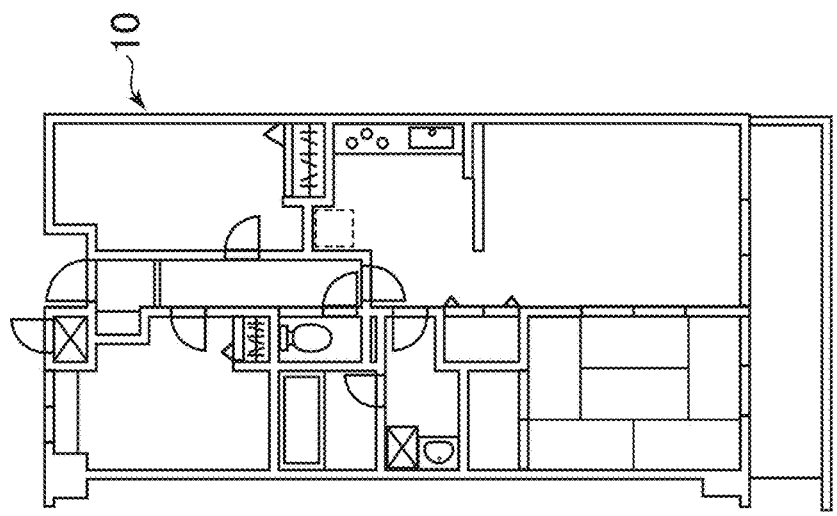
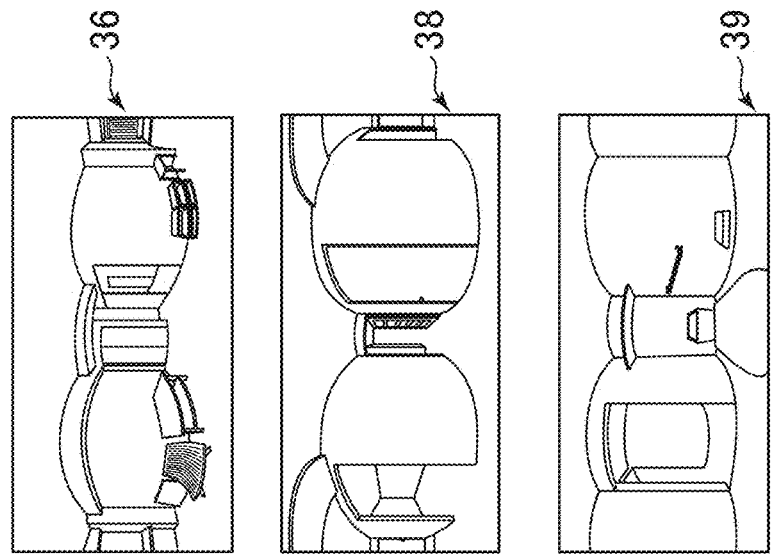
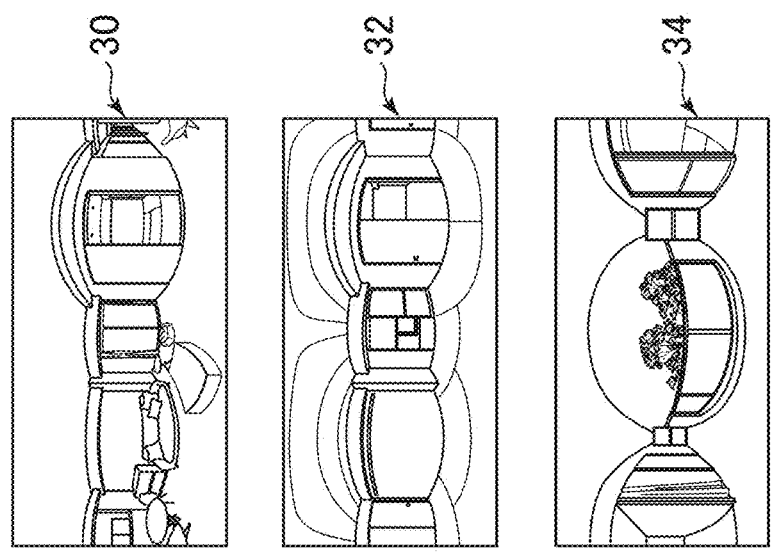

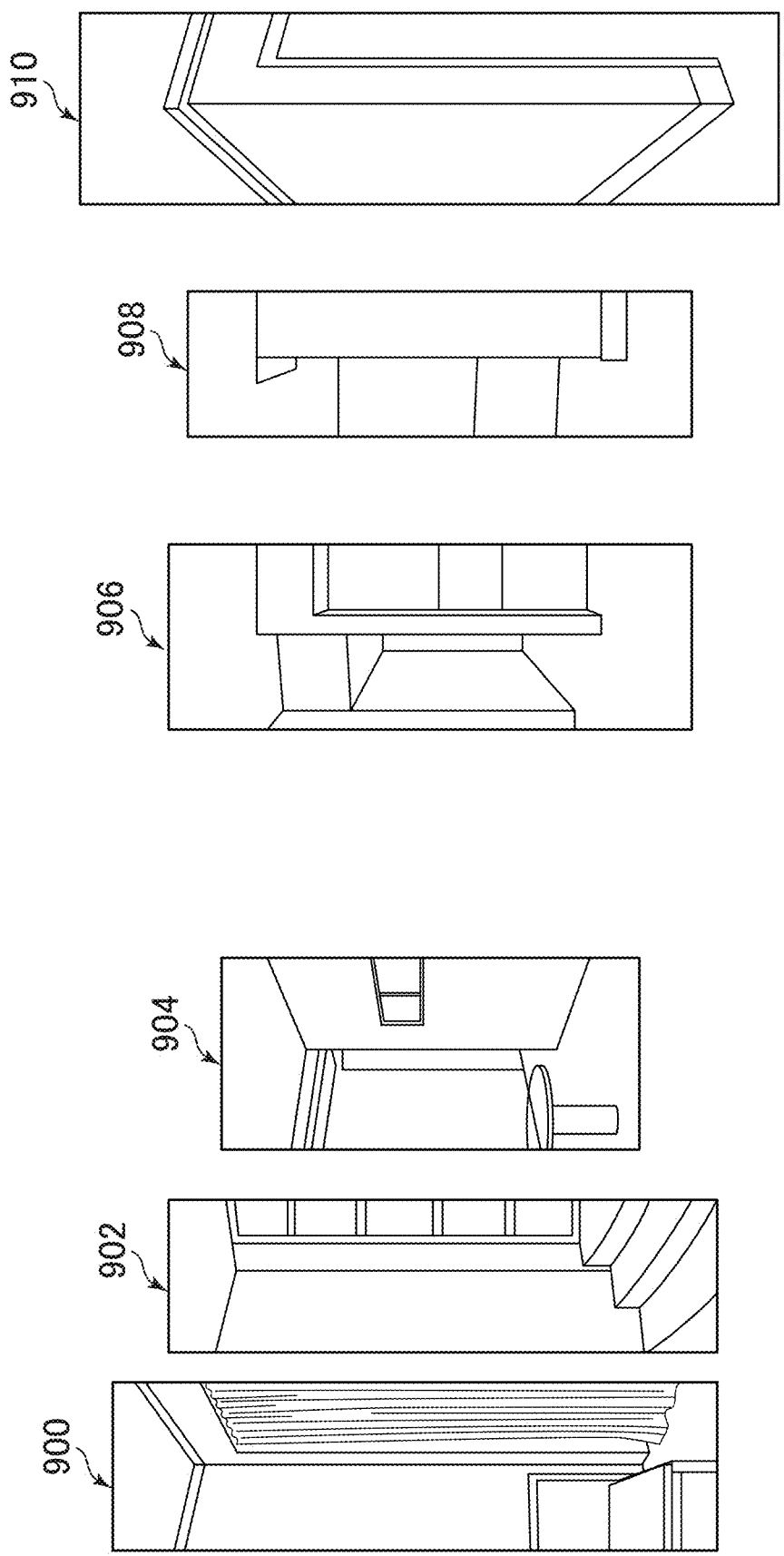

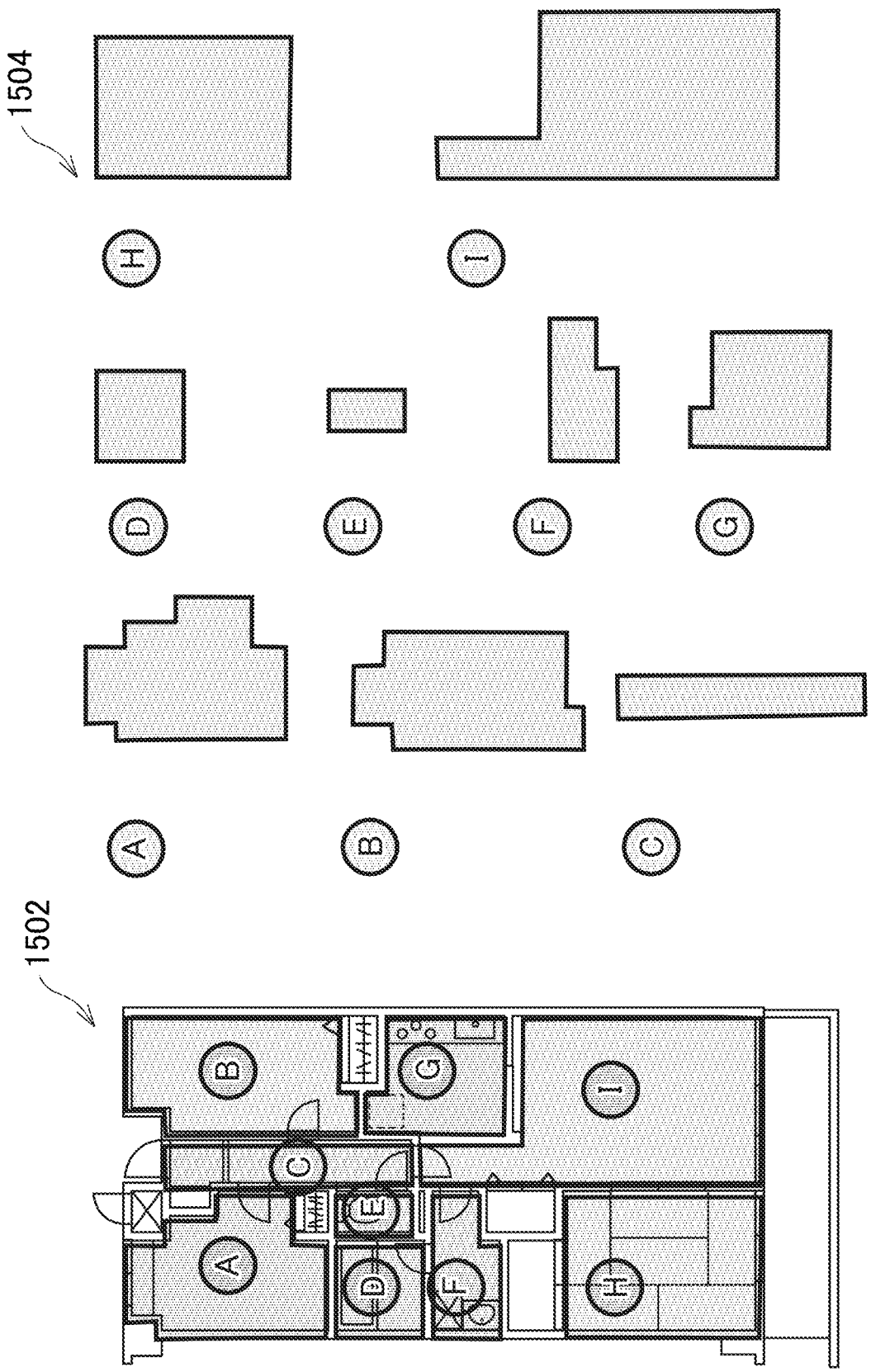

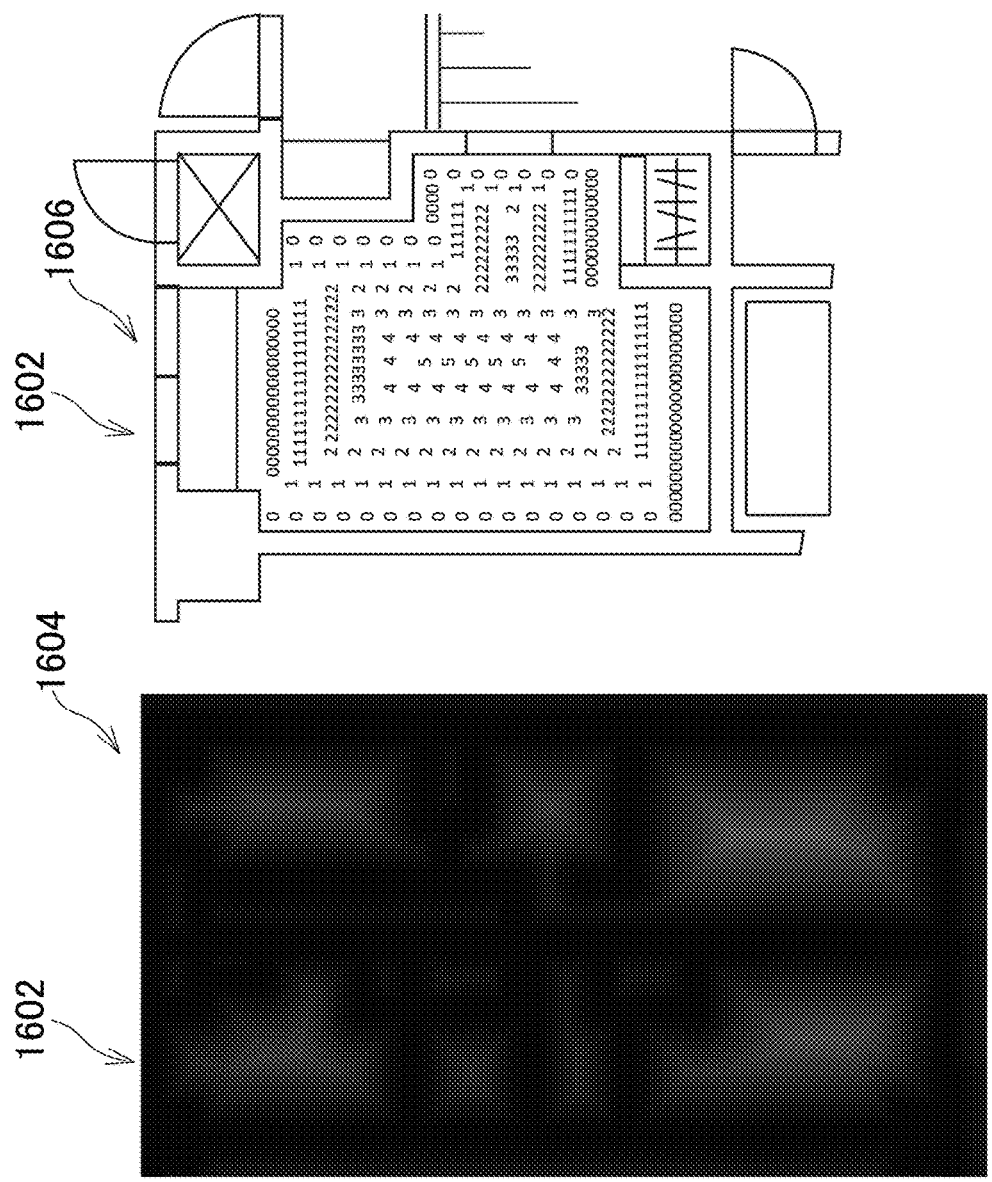
FIG.13C
FIG.13B
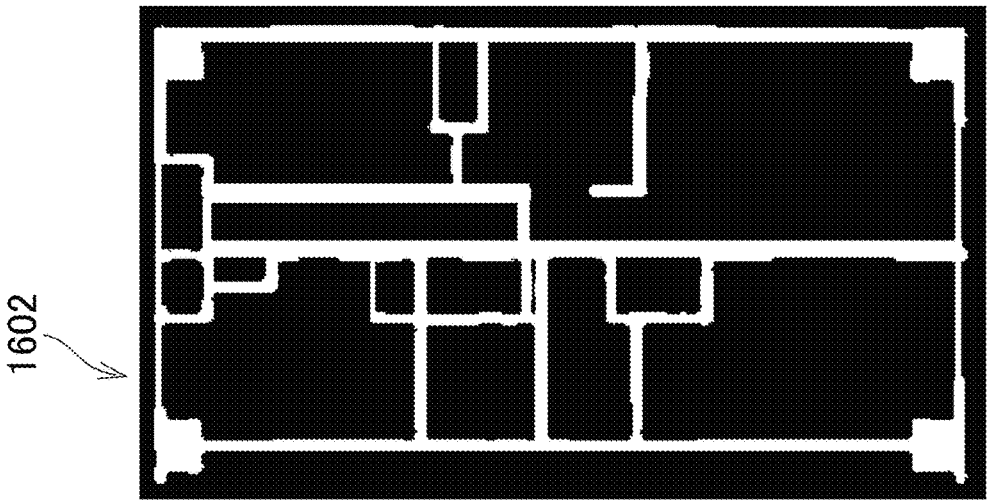
FIG.13A

FIG.15A

Floor plan (186)

```
DDDCACCAAAAACAAAAAAAAAAACCWWACCCAACC
AAAAAACAACAACDDAAAAAAAAACCWWACACAAAA
AAAAAAACDACADDDAAAAAAAAAAACCDDDDAAAA
AAAACDDDAAAAACAAAAAAAAACAAAAAAAACAAA
AAAAACAAAAAACAAAAAAAAAAAACAAAADDAAAA
DDAACACAAAAAAACAAAAACAAADDDADDDAAAAD
AAAACAAAAWWWWAADDDDDAACCACAAAAACAAAA
DDDDDCWWWWACCAAAAAAAAAAAACAAACCACAAD
AAAACCCAWWWWAADDDDDDAAAAADCWWWACAAAA
``` panorama (182, 184)

```
AAAAACCCWWWCACAACCDDDDCACCAAAACAAAAA
WCCCAAAAAAAAAAACWWWACDDDAAAAAAAAACCCW
CADDDDDAAAAAAAACDDCDDDDDDAAAAAAADWC
AACAAAAAAAAAACDDDDDAAACAAAAAAAAACAAA
AAAACDDDDDDDAAACAAAACAAAAAAAAAACAAA
DDDAADCDDCACACAAAAAAACAAAAACAAAAAA
AAAAAACAAAAACAACAAWWWWCADDDDDAAACAAA
WWAACADDDDDDACWWWWCCCAAAAAAAAACWWW
AAAACAAAAAAAACCAWWWWCADDDDDDDDAAWWCD
```

```
 0: AAAAACCCWWWCACAACCDDDDCACCAAAACAAAAA
 1: AAAACCCWWWCACAACCDDDDCACCAAAACAAAAAA
 2: AAACCCWWWCACAACCDDDDCACCAAAACAAAAAAA
 3: AACCCWWWCACAACCDDDDCACCAAAACAAAAAAAA
 4: ACCCWWWCACAACCDDDDCACCAAAACAAAAAAAAA
 5: CCCWWWCACAACCDDDDCACCAAAACAAAAAAAAAC
 6: CCWWWCACAACCDDDDCACCAAAACAAAAAAAAACC
 7: CWWWCACAACCDDDDCACCAAAACAAAAAAAAACCC
 8: WWWCACAACCDDDDCACCAAAACAAAAAAAAACCCW
 9: WWCACAACCDDDDCACCAAAACAAAAAAAAACCCWW
10: WCACAACCDDDDCACCAAAACAAAAAAAAACCCWWW
11: CACAACCDDDDCACCAAAACAAAAAAAAACCCWWWC
12: ACAACCDDDDCACCAAAACAAAAAAAAACCCWWWCA
13: CAACCDDDDCACCAAAACAAAAAAAAACCCWWWCAC
14: AACCDDDDCACCAAAACAAAAAAAAACCCWWWCACA
15: ACCDDDDCACCAAAACAAAAAAAAACCCWWWCACAA
16: CCDDDDCACCAAAACAAAAAAAAACCCWWWCACAAC
17: CDDDDCACCAAAACAAAAAAAAACCCWWWCACAACC
18: DDDDCACCAAAACAAAAAAAAACCCWWWCACAACCD
19: DDDCACCAAAACAAAAAAAAACCCWWWCACAACCDD
20: DDCACCAAAACAAAAAAAAACCCWWWCACAACCDDD
21: DCACCAAAACAAAAAAAAACCCWWWCACAACCDDDD
22: CACCAAAACAAAAAAAAACCCWWWCACAACCDDDDC
23: ACCAAAACAAAAAAAAACCCWWWCACAACCDDDDCA
24: CCAAAACAAAAAAAAACCCWWWCACAACCDDDDCAC
25: CAAAACAAAAAAAAACCCWWWCACAACCDDDDCACC
26: AAAACAAAAAAAAACCCWWWCACAACCDDDDCACCA
27: AAACAAAAAAAAACCCWWWCACAACCDDDDCACCAA
28: AACAAAAAAAAACCCWWWCACAACCDDDDCACCAAA
29: ACAAAAAAAAACCCWWWCACAACCDDDDCACCAAAA
30: CAAAAAAAAACCCWWWCACAACCDDDDCACCAAAAC
31: AAAAAAAAACCCWWWCACAACCDDDDCACCAAAACA
32: AAAAAAAACCCWWWCACAACCDDDDCACCAAAACAA
33: AAAAAAACCCWWWCACAACCDDDDCACCAAAACAAA
34: AAAAAACCCWWWCACAACCDDDDCACCAAAACAAAA
35: AAAAACCCWWWCACAACCDDDDCACCAAAACAAAAA
```

FIG.16

AWWWDDCCCCWW ,232
↓      ↓      ↓
AWAWDDDCCCAWW ,234

FIG.20

Distance matrix

| panorama / Floor plan | 1 | 2 | 3 | 4 | 5 | 6 | 7 | 8 | 9 |
|---|---|---|---|---|---|---|---|---|---|
| 1 | [[ 5, | 15, | 20, | 14, | 14, | 14, | 13, | 17, | 15,] |
| 2 | [ 13, | 9, | 16, | 10, | 13, | 12, | 15, | 19, | 18,] |
| 3 | [ 18, | 13, | 10, | 8, | 11, | 14, | 14, | 21, | 19,] |
| 4 | [ 14, | 13, | 17, | 4, | 9, | 10, | 9, | 19, | 16,] |
| 5 | [ 15, | 12, | 16, | 8, | 9, | 12, | 12, | 20, | 17,] |
| 6 | [ 16, | 15, | 16, | 11, | 9, | 8, | 13, | 17, | 14,] |
| 7 | [ 13, | 15, | 18, | 10, | 11, | 12, | 7, | 15, | 11,] |
| 8 | [ 13, | 16, | 19, | 13, | 12, | 12, | 15, | 12, | 12,] |
| 9 | [ 14, | 12, | 19, | 16, | 13, | 15, | 11, | 13, | 10,]] |

Matching Angle: [ 190, 90, 90, 90, 150, 80, 80, 80, 90,]

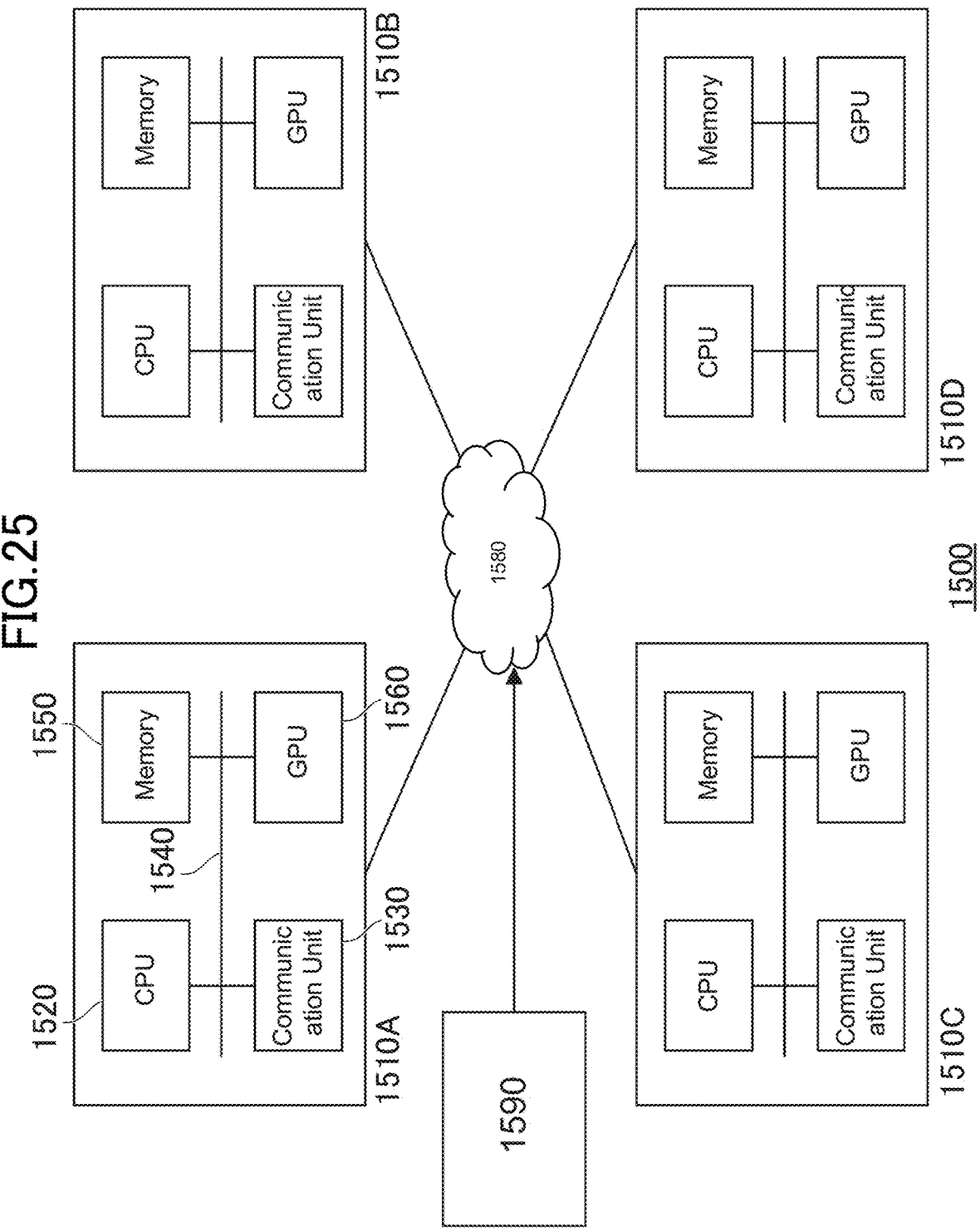

METHOD AND APPARATUS FOR ASSIGNING IMAGE LOCATION AND DIRECTION TO A FLOORPLAN DIAGRAM BASED ON ARTIFICIAL INTELLIGENCE

FIELD OF THE INVENTION

The present disclosure relates to image analysis and matching using artificial intelligence.

BACKGROUND

In searching for a property such as a house or apartment, online viewing of the premises has become popular with the advent and growth of the Internet. This allows the user to search a large number of properties without having to visit the properties in person. Real estate brokers and listing agents often take pictures of a property and post the pictures in an online listing. The online listing will often have a floorplan of the property, in addition to the pictures posted by the agent. Sometimes the pictures will be labeled, or the pictures will be associated with a room in the property. For example, the listing agent could label a picture as "master bedroom", "kitchen", "bonus room", etc. However, the listing agent usually will not include an exact location where the picture was taken in the property, and usually will also not provide an orientation what direction the picture was taken within the property.

The layout of the property can be shown in a floorplan image which can indicate property features and areas such as bedrooms, kitchen, closets, balconies, room dimensions, etc. The property features can sometimes be labeled to aid in the identification of the feature. FIG. 1 is an example of a floorplan image 10 and shows a floorplan of an apartment. Rooms 2 and 8 are bedrooms, connected by a hallway 4. A multipurpose room 6 is adjacent to living room 3. Kitchen 9 is located adjacent to the living room 3.

FIG. 2 shows an example of a room photograph 20 of an online listing. Photograph 20 can be taken from a standard digital camera. No additional information is provided in photograph 20 and the user is left to guess which area of the property the photograph is showing.

SUMMARY

Until now, the only way to associate panoramic images with a location and orientation in a floorplan, was to do it by hand. That is, a person would need to view the image and determine where in the floorplan the image was taken and at which orientation. This could be a very difficult task whose difficulty greatly increases as the number of images increases. For example, a large home having ten rooms with ten corresponding panoramic images, would take a long time to match by hand. Accurately determining panoramic image with the proper location in the floorplan and proper orientation in the floorplan could be very difficult. For example, similar rooms, such as bedrooms, could be difficult to match by hand. The only way to be sure that the image was correctly matched with a floorplan location was to note, at the time the image was taken, where in the floorplan the image was taken and in what orientation the image was taken. Absent this data, it was nearly impossible to perform an accurate location and orientation of a group of panoramic images by hand.

Further, there are currently millions of properties listed online. For practical purposes, orientation and location information is unattainable, notwithstanding the present invention and its embodiments, described herein. Thus, creating an automated, computer implemented AI system which could quickly and efficiently match panoramic images with floorplan locations and orientations and create a virtual tour, was sought by the inventors.

In view of the above, the inventors have created a new machine and method using artificial intelligence (AI) for assigning a location and orientation to one or more panoramic images of a property, and using the assigned image locations and orientations to create a virtual tour of a property. A set of one or more images, preferably panoramic images showing a wide field of view, and a corresponding floorplan image, are input into a special purpose computer system. The one or more panoramic images are then matched with a specific location in the floorplan in which the panoramic images were taken. An orientation of what direction the images were taken is also determined in the embodiments of the invention.

In an embodiment of the invention, the floorplan image can be parsed into individual locations, such as rooms, hallways, balconies, basements, etc. This can be done using a segmentation process to identify objects and other features of the floorplan image. Example of objects that can be identified include walls, corners doors, windows, stairs, toilets, sinks, bathtubs, showers, stove refrigerators, built-in features such as bookcases and cabinets, kitchen islands, or any other feature which could be labeled or identified from a floorplan image.

In an embodiment of the invention, a distance transformation can be performed on a floorplan image or a processed version of the floorplan image that extracts image regions representing objects such as walls, doors, windows, etc. The distance transformation can indicate the distance between any point in the floorplan image and the nearest object, such as a wall, door, window, etc.

Objects can also be detected in each individual panoramic image, for the set of panoramic images, which have been taken at the property. The objects detected in each of the panoramic images and the objects detected in the floorplan image, can be compared with one another to find a match between a panoramic image and a location where the panoramic image was taken in the floorplan image. With this matching, a specific panoramic image can be associated with a particular location in the floorplan image where the panoramic image was taken. This can be done for each panoramic image. Further, an orientation of each panoramic image can also be ascertained based on the matching of objects in each of the panoramic images and the floorplan image.

Once the location and orientation of each of the panoramic images that were taken within the floorplan has been determined, a virtual tour can be created providing an automatic and/or interactive tour of the property, which provides the corresponding panoramic image with the floorplan location visited in the virtual tour. The panoramic image can also be edited to appear as a standard field of view image for the virtual tour. That is, the panoramic image can be cropped or otherwise edited so that a standard field of view is shown in the virtual tour instead of the wide field of view of the panoramic image.

As an example, a realtor could visit a property and take panoramic images of some or all of the rooms in the property. The realtor could then upload these images to the computer system. The realtor would also upload a floorplan image into the computer system. Any format of panoramic image and floorplan image could be uploaded into the computer system, including images with different formats, such as JPEG, TIFF, BMP, PNG, etc. The computer system would then match each panoramic image to the correct location in the floorplan; i.e. where in the floorplan the images were taken. The computer system would also identify the direction in which the panoramic images were taken; i.e. match a panoramic image direction with a direction in the floorplan image.

Once the panoramic images were matched with the floorplan image, the computer system would automatically create a virtual tour of the property, whereby a tour of the property, through the floorplan would be created. The virtual tour could mimic bow a user would move through the property, from room to room.

The inventors disclose herein apparatus and method for assigning a location and orientation to one or more panoramic images of a property, and using the assigned image locations and orientations to create a virtual tour of a property, using one or more special purpose computers implementing AI and computer hardware, such as a convolutional neural network system (hereinafter referred to as a "CNN system" or "CNN"). These concepts will be described in more detail below.

BRIEF DESCRIPTION OF THE DRAWINGS

The following drawings illustrate examples of various components of embodiments of the invention disclosed herein and are for illustrative purposes only.

FIG. 3 shows a set of panoramic images and a floorplan image input into an embodiment of the invention;

FIGS. 7A, 7B and 7C show a first, second and third example, respectively, of classes of objects which can be detected from a panoramic image;

FIGS. 11A and 11B show a determination of the rooms or areas identified based on the floorplan image according to an embodiment of the invention;

FIGS. 13A, 13B and 13C show an example of determining a distance between a location and a nearest wall according to the second method of an embodiment of the invention;

FIG. 15A shows an example of creating character string data from a panoramic image and floorplan image;

FIG. 15B shows an example of generating different angles of a character string for a panoramic image;

FIG. 16 shows an example of calculating an edit distance between two character strings;

FIG. 20 shows a distance matrix of edit distances with respect different panoramic images and floorplan locations;

FIG. 25 shows an example of a hardware configuration used to implement the invention.

DETAILED DESCRIPTION OF THE DRAWINGS

Figure 1:
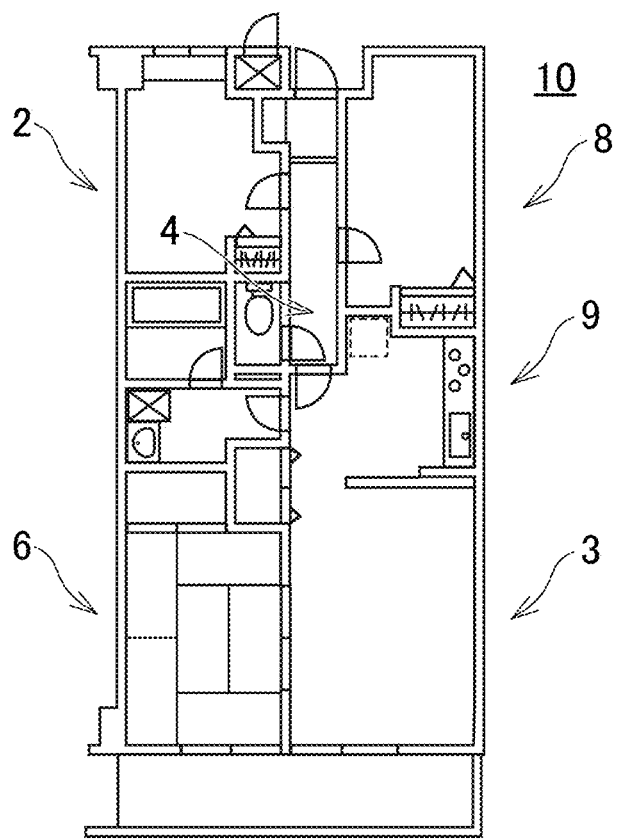
FIG. 1 shows a floorplan image of an apartment.
Figure 2:
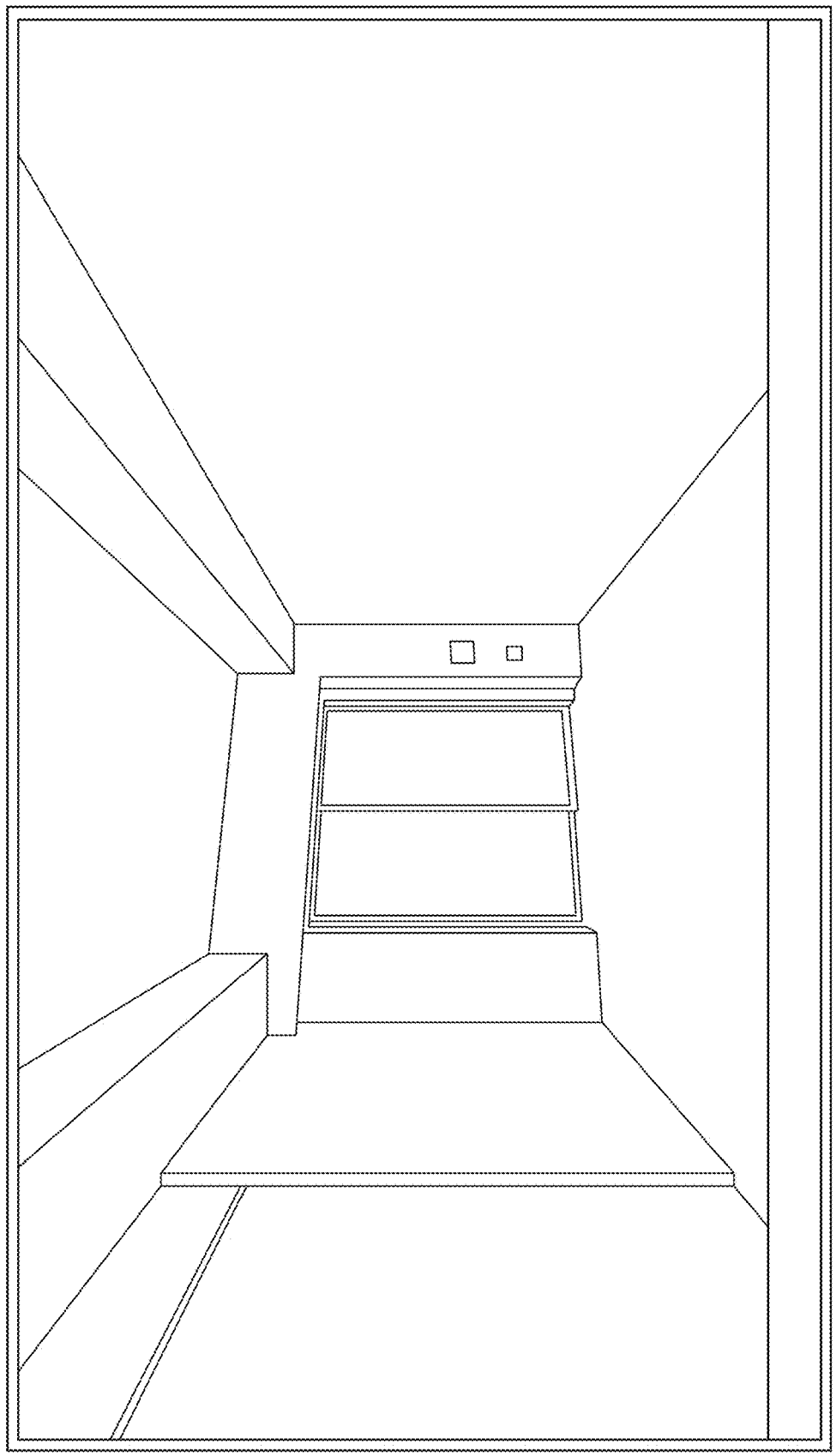
FIG. 2 shows an image of a room used in an online listing.

The illustrative block diagrams and flowcharts depict process steps or blocks that may represent modules segments, or portions of code that include one or more executable instructions for implementing specific logical functions or steps in the process. Although the particular examples illustrate specific process steps or procedures, many alternative implementations are possible. Some process steps may be executed in different order from the specific description herein based on, for example, considerations of function, purpose, conformance to standard, legacy structure, user interface design, and the like.

A number of embodiments of the invention have been described. It should be understood that various modifications may be made without departing from the spirit and scope of the invention. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

FIG. 3 provides an example of the inputs into an embodiment of the present invention. As shown in FIG. 3, six panoramic images 30, 32, 34, 36, 38 and 39 and floorplan image 10 are input into computing system 1510 (described later in FIG. 25.). This embodiment is not limited to six panoramic images, e.g., the number of panoramic images input into the computer system 1510 could range from one image to an upper limit that is only limited by computational processing resources. A panoramic image can be any image with a wide field of view which is capable of capturing two or more objects in an interior location within a property. A panoramic image can have a field of view of 360° in a horizontal direction, however smaller fields of view such as 270°, 180°, 90°, or less, could also be used. In the case of the panoramic images 30, 32, 34, 36, 38 and 39, they each have a full 360° field of view and have an aspect ratio of 2:1 or larger (e.g., 4:1 or 10:1). The image can be taken using a special purpose 360° digital camera, a standard camera which was rotated 360° about a point within the floorplan image in a horizontal direction, or any other type of camera whose pictures can be digitally stitched together to form a panoramic image. The term panoramic image and room image can be used interchangeably. That is, a panoramic image is taken of a room, or space within a building and can also be referred to as a room image.

A digital image allows for computer editing of the panoramic image. For example, it may be helpful crop the image in a horizontal direction to make the image easier to view for a user. That is, instead of having a field of view of 360° when creating the virtual tour, a more natural 90° field of view could be used when looking in a particular direction (e.g., down a hallway) of the room in the floorplan. This function is standard in panoramic image viewers. The viewers can take a panorama image as input and project it into a simple shape like a box, cylinder or sphere and the (virtual) camera placed inside this shape to view the room to show on the screen. Additionally, a digital image can also easily be rotated so that a central location of the image is moved in a horizontal direction. The opposing ends of the 360° panoramic image can be stitched together or cut in any place in the image. This can be accomplished with the use of image editing software. Further, the panoramic image can also be in any image format including JPEG, TIFF, GIF, BMP, PNG, etc. The present system, using a form of artificial intelligence, such as a convolutional neural network (CNN) or other image recognition and object identifying system, can use the panoramic image(s) to acquire the necessary information to help create an accurate virtual tour.

CNN is a class of deep, feed-forward artificial neural networks, most commonly applied to analyzing visual imagery. CNNs can use a variation of multilayer perceptrons (MLP) designed to require minimal preprocessing. They are also known as shift invariant or space invariant artificial neural networks (SIANN), based on their shared-weights architecture and translation invariance characteristics. One advantage of CNNs is that they use relatively little preprocessing compared to other image classification algorithms. Thus, the network learns the filters that in traditional algorithms were hand-engineered. This independence from prior knowledge and human effort in feature design is a major advantage over conventional methods.

The floorplan image is a diagram of the arrangement of room(s) in a building, typically drawn to scale. There are a variety of types or styles of floorplans that are used by retailers, architect, realtors, etc. For example, artistic differences often exist in floorplan images. That is, two floorplan images of the same property will often have many similarities but will inevitably be different in certain respects. For example, these differences can include different shading, different items identified in the floorplan image (rooms, kitchen, toilet, etc.), and different illustrations representing the same item. However, no set standard of a floorplan image needs to be input into the present computer system. Further, the floorplan image can also be in any image format including PEG, TIFF, GIF, BMP, PNG, etc. The present computer system, using a convolutional neural network (CNN) or other AI, or image recognition and object identifying system, can use the floorplan image to acquire the necessary information to help create an accurate virtual tour.

Figure 4:
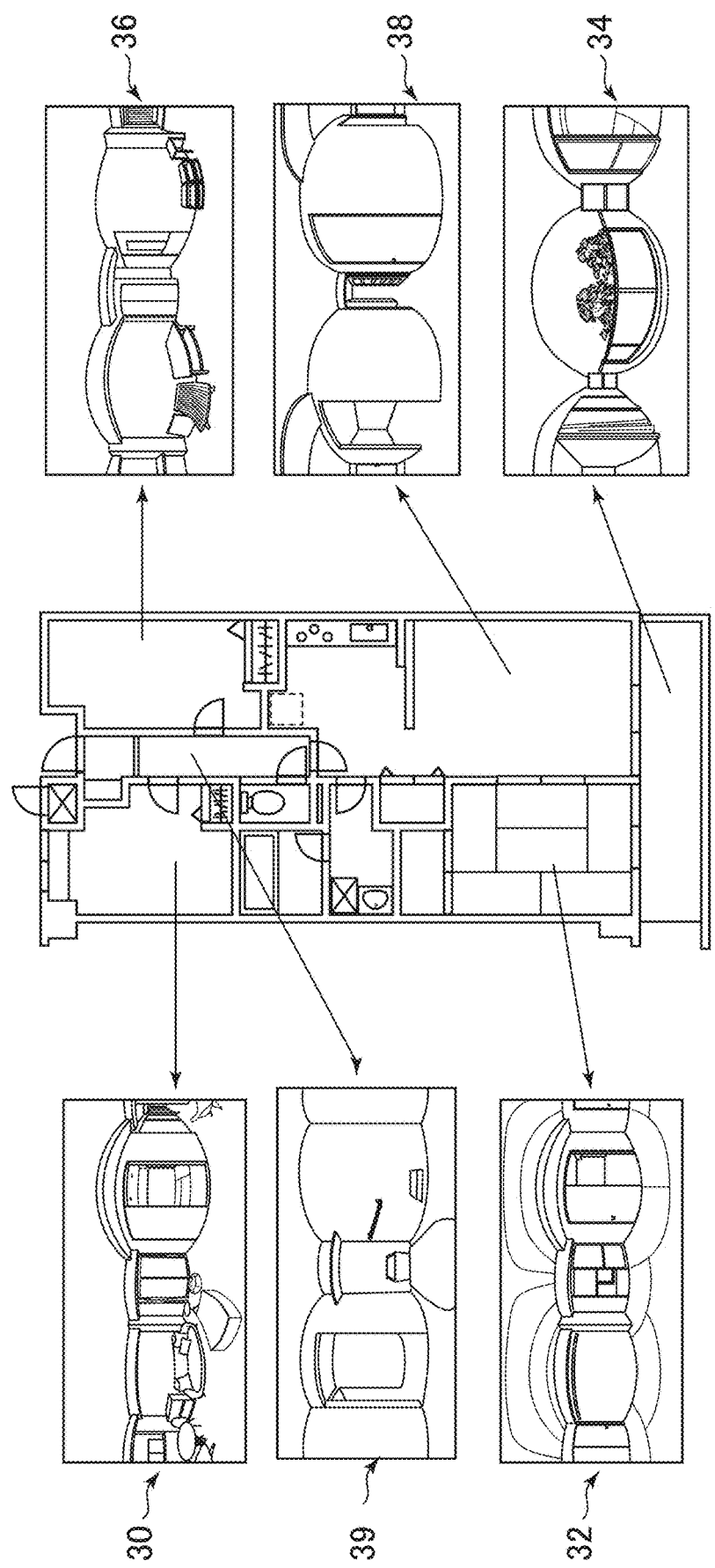
FIG. 4 shows a first output according to an embodiment of the invention.

FIG. 4 shows a first aspect of the output of the computing system according to an embodiment of the invention. Specifically, each of the panoramic images 30, 32, 34, 36, 38 and 39 are associated with a location within the floorplan image 10, where the panoramic image was taken. The details of how the location of where the panoramic images are taken within the floorplan image 10 is determined, are discussed in more detail below.

Using the data acquired from the object detection in the set of panoramic images and the floorplan image, the computer system is able to determine the location of where each panoramic image was taken within the floorplan image. Further, an orientation of each panoramic image can also be determined by the system. That is, the orientation of the panoramic image at the determined location within the floorplan image can be ascertained. This orientation information can later be used to orient the panoramic images when creating a virtual tour.

Figure 5:
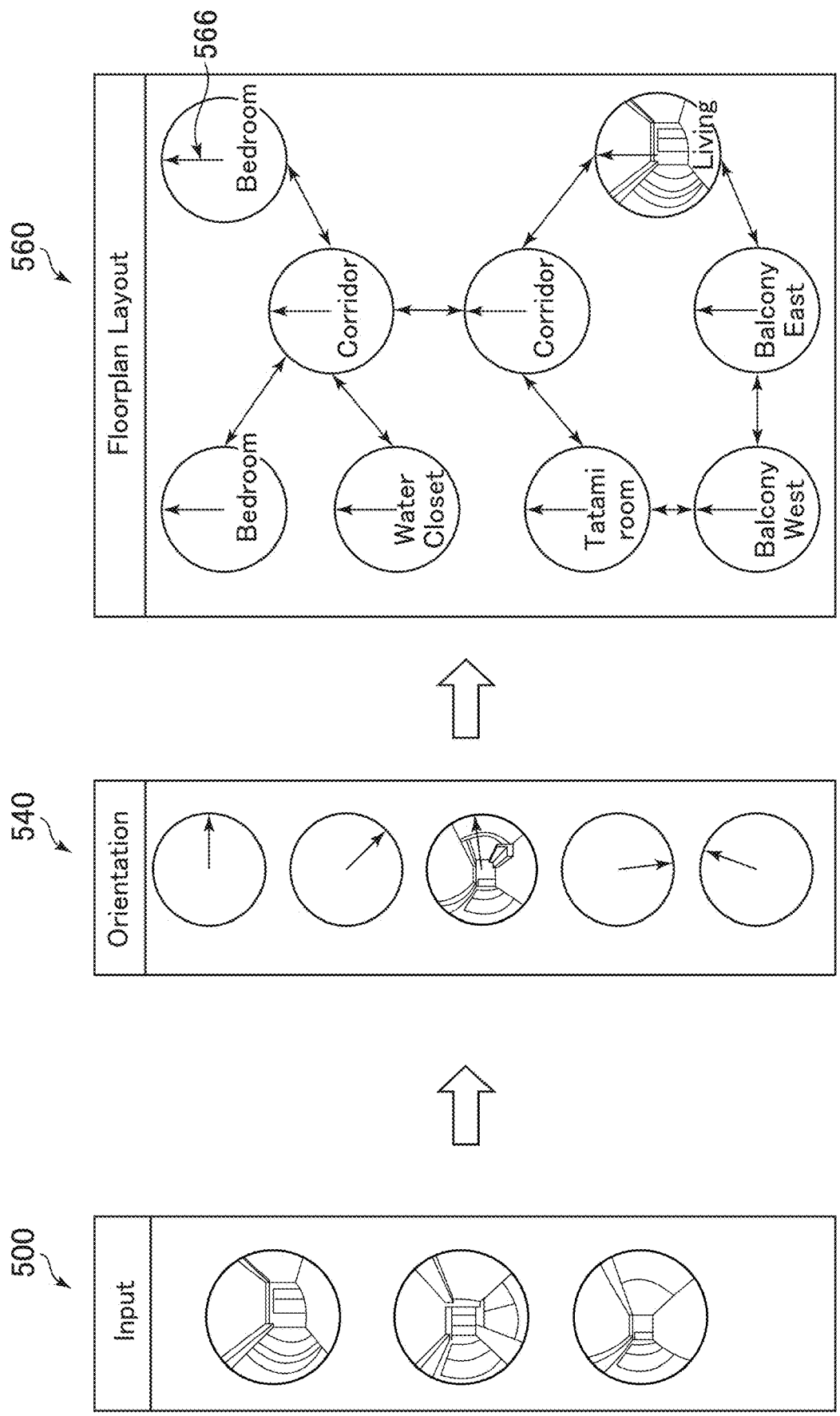
FIG. 5 shows a second and third output according to an embodiment of the invention.

FIG. 5 shows a second and third aspect of the output of the computing system according to an embodiment of the invention. A second aspect is shown in the orientation 540. Specifically, the orientation of each of the panoramic images 500 with respect to different locations within the floorplan is an output of the computing system. This is shown by orientation arrow 566. After the panoramic room images 500 are input into the computing system 1510, discussed below with respect to FIG. 25, an orientation of the panoramic image is determined as shown in orientation 540. If a 360° panoramic image is used, the orientation (or direction the image is facing) of the image is considered to be located in the center of the image, in a horizontal direction.

A third aspect of an embodiment of the invention shown in FIG. 5, is the connectivity between the various rooms and locations. This is indicated by connectivity arrows 562 and 564, as an example. These arrows show how the floorplan can be traversed and which spaces are accessible within the property from other spaces. For example, if the user was in the tatami room, the user would have a choice to go to the first corridor or to the west balcony. This connected layout can be achieved by determining the floorplan layout and by determining where doors and hallways are located on the floorplan layout. This is based on the floorplan image that is input into the computer system. This becomes important when creating a virtual tour of the property.

A CNN can be used to segment a floorplan image and locate and identify objects such doors, or spaces between walls, which link one area of the floorplan to another area of the floorplan. This can be done for the entire floorplan image to create a connectivity map 560, as shown in FIG. 5, specifically with respect to connectivity arrows 562 and 564.

Figure 6:
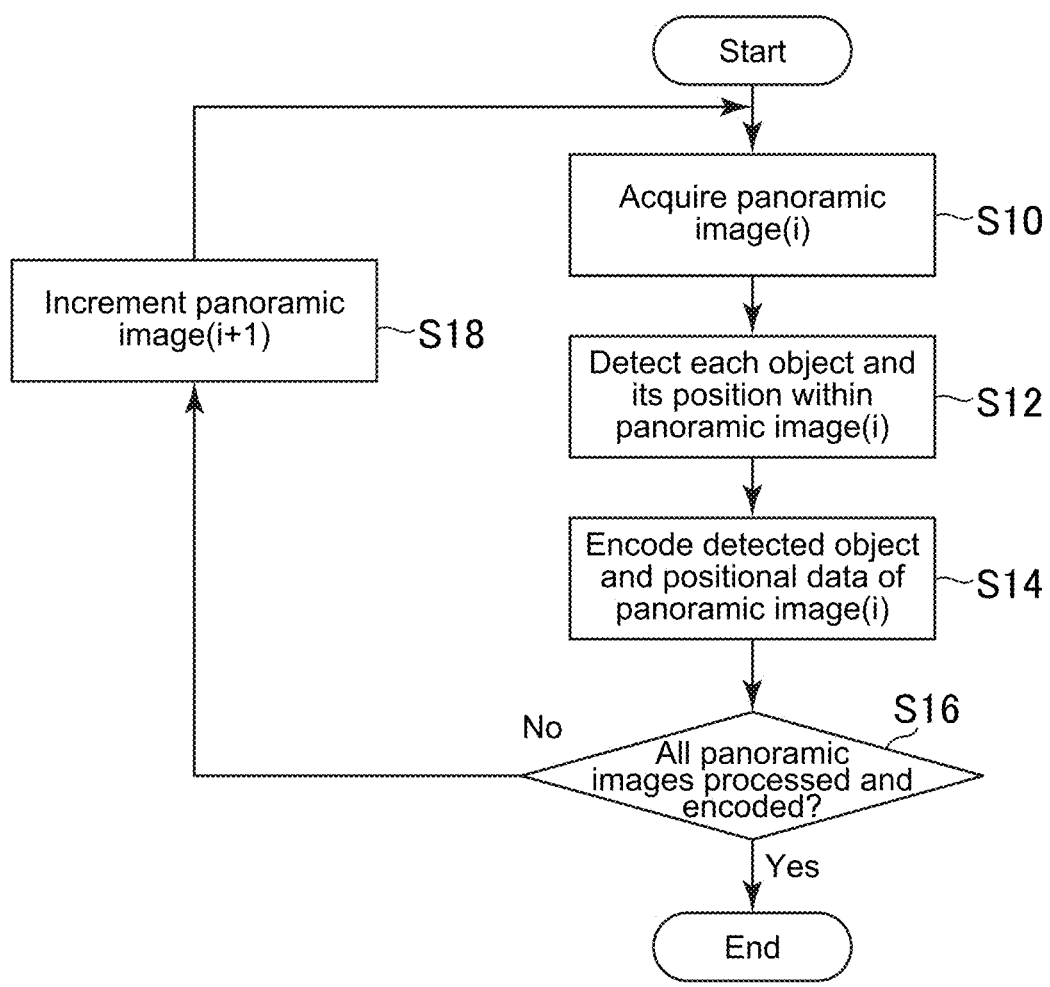
FIG. 6 shows a method of detecting an object within a panoramic image, for a set of panoramic images.

FIG. 6 is a flowchart showing the method of finding objects in each panoramic image in a set of panoramic images. As shown in step 10, a panoramic image is received by the computing system 1510. This image is taken from a location within the floorplan from which a virtual tour is to be created. The panoramic image preferably has a 360° field of view within the floorplan, but lesser viewing angles are also possible.

Figure 7A:
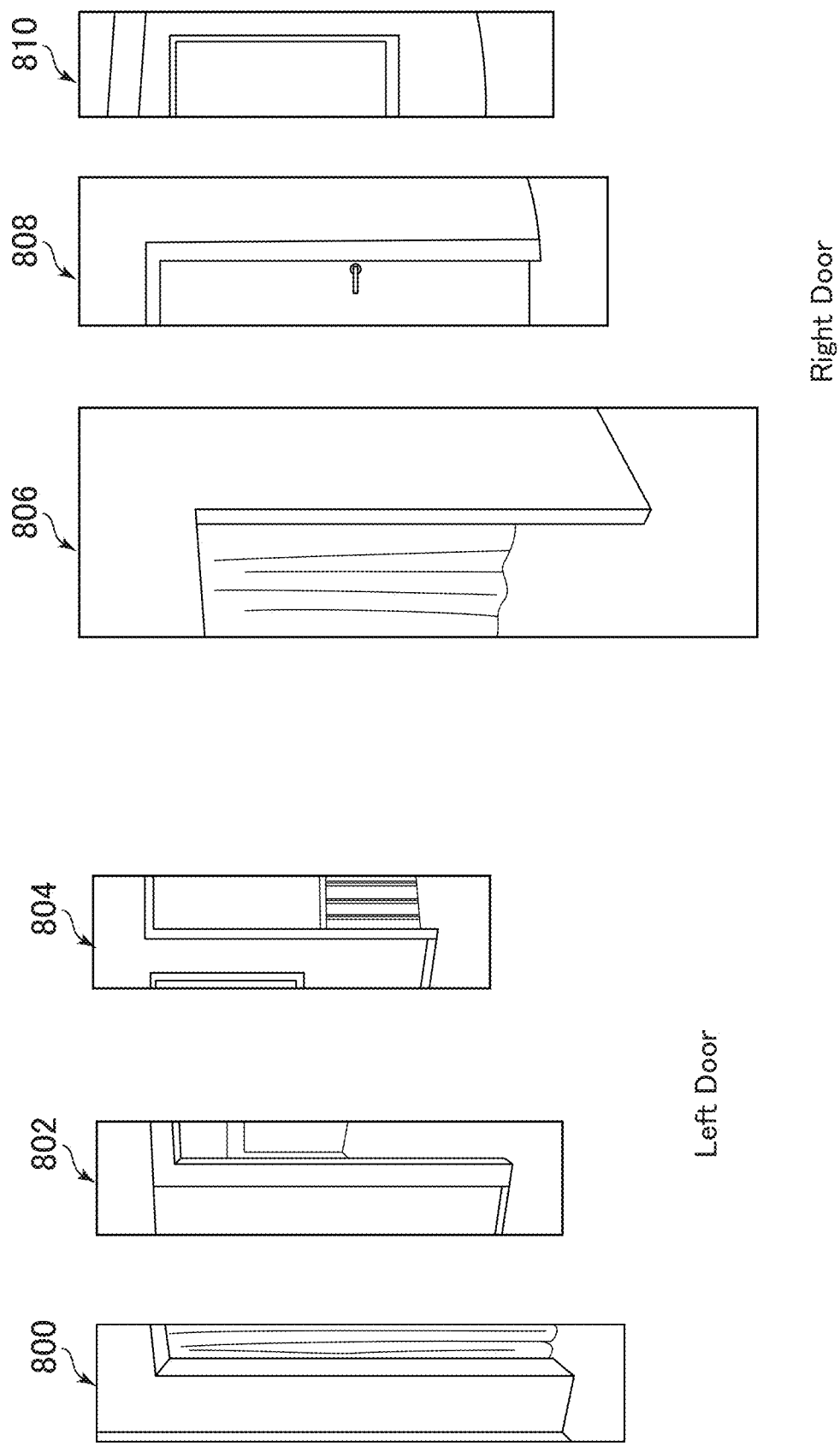
Figure 7C:
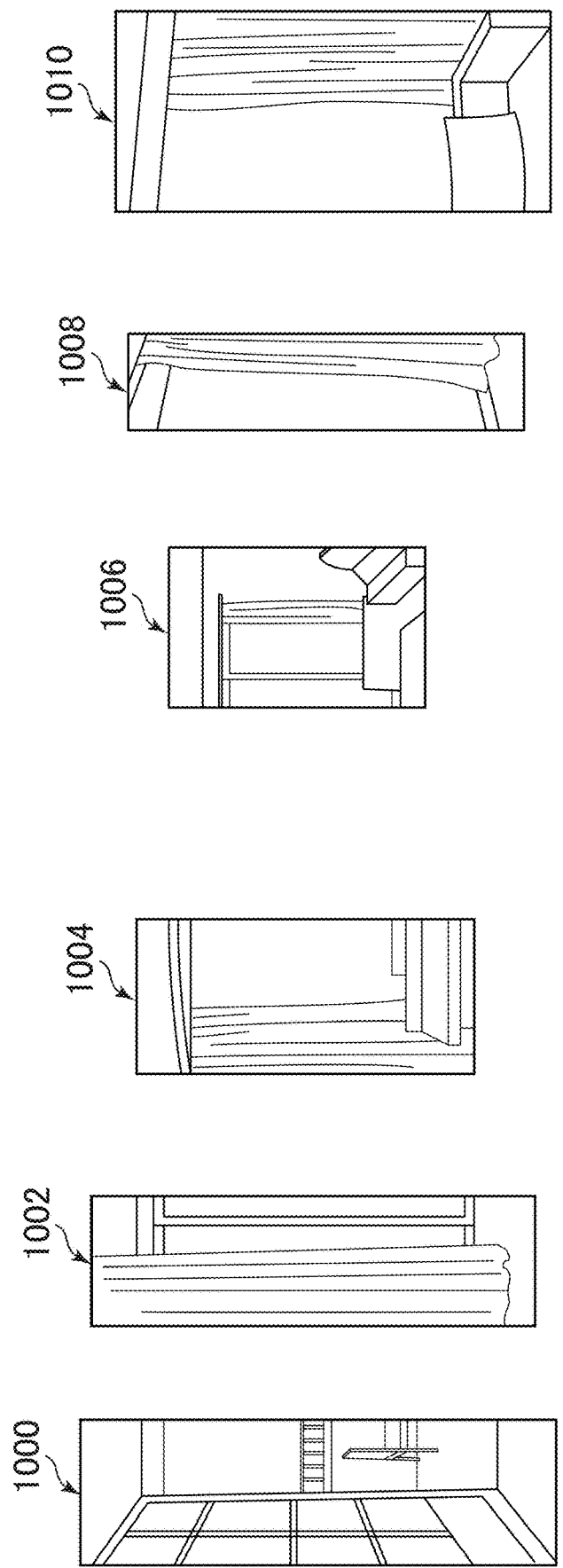

In step 12, the panoramic image is analyzed to determine objects within the image and the respective positions of the objects within the panoramic image. The objects to be determined are defined in advance by an, object class. That is, as shown in FIGS. 7A, 7B and 7C, corners, door and windows are each examples of object classes that can be determined from the panoramic image. However, the objects that can be detected are not limited to this. Examples of objects that can be detected include walls, stairs, toilets, sinks, bathtubs, showers, stoves, refrigerators, built-in features such as bookcases and cabinets, kitchen islands, or any other feature which could be labeled or identified from an image.

Further, subclasses of these objects can also be detected and classified. For example, FIG. 7A shows that a class of doors is detected, but further shows two subclasses of objects that can be detected, specifically left doors 800, 802 and 804, and right doors 806, 808 and 810. FIG. 7B shows that a class of corners is detected, but further shows two different subclasses of objects which can be detected, specifically concave corners 900, 902 and 904 and convex corners 906, 908 and 910. FIG. 7C shows that a class of windows can be detected, but further shows two more subclasses of objects that can be detected, left windows 1000, 1002 and 1004, and right windows 1006, 1008 and 1010.

It is known that different subclasses of the various objects may be detected, not just the subclasses listed above. For example, styles of doors and windows or window frames can be detected. Further, various types of corners, or molding could also be detected. A CNN can be trained to recognize various classes/subclasses of objects, including the classes and subclasses of objects discussed above. One advantage of detecting these subclasses of objects is to increase accuracy of the match of panoramic images to floorplan location image in the virtual layout.

The objects can be detected using any techniques as long as the objects and their position within the panoramic image can be accurately identified. For example, a trained convolutional neural network (CNN) could be used for object detection. The CNN can be trained to detect, corners, windows, doors, etc. For a discussion of how to use a CNN to detect objects in an image, please see U.S. patent application Ser. Nos. 15/798,349 and 15/798,343, the contents of which are herein incorporated in their entirety by reference. Other methods of object detection could also be employed, and the embodiment of the invention is not limited to CNN's.

In addition to be object label, the CNN can also output a probability that the particular object is actually the stated object. For example, a probability of an object being correctly identified as the actual object, e.g. door, could be 98.0%. The object could also have a 1.0% chance of being a window and a 1.0% chance of being a corner, according to the CNN. For the purposes of this embodiment, the most likely object is used as the determined object. Thus, if the object has a 98.0% probability of being a door and a 1.0% probability of being a window and a 1.0% chance of being a corner, the computer system will interpret the object as being a door. However, other embodiments could use a different threshold when determining objects. For example, if an object only had a 65% probability of being a particular object, the object may be ignored, or further analysis of the object could be performed to increase the likelihood of correctly identifying the object. Still other embodiments could use the raw probabilistic score of the object, as will be discussed later.

Figure 18A:
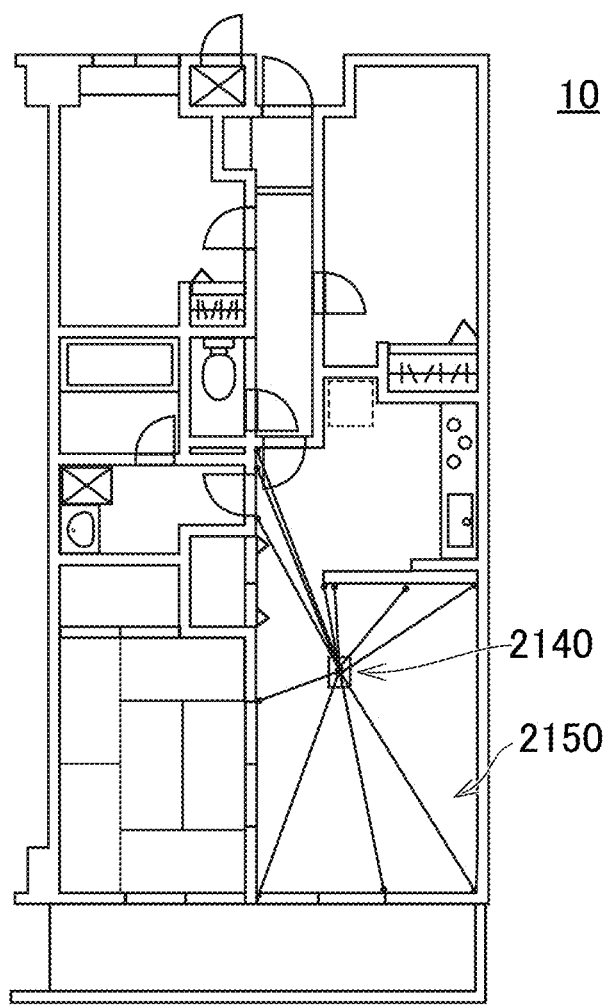
FIG. 18A shows a floorplan image and a point within the floorplan image which corresponds to detected objects of FIG. 18B.
Figure 18B:
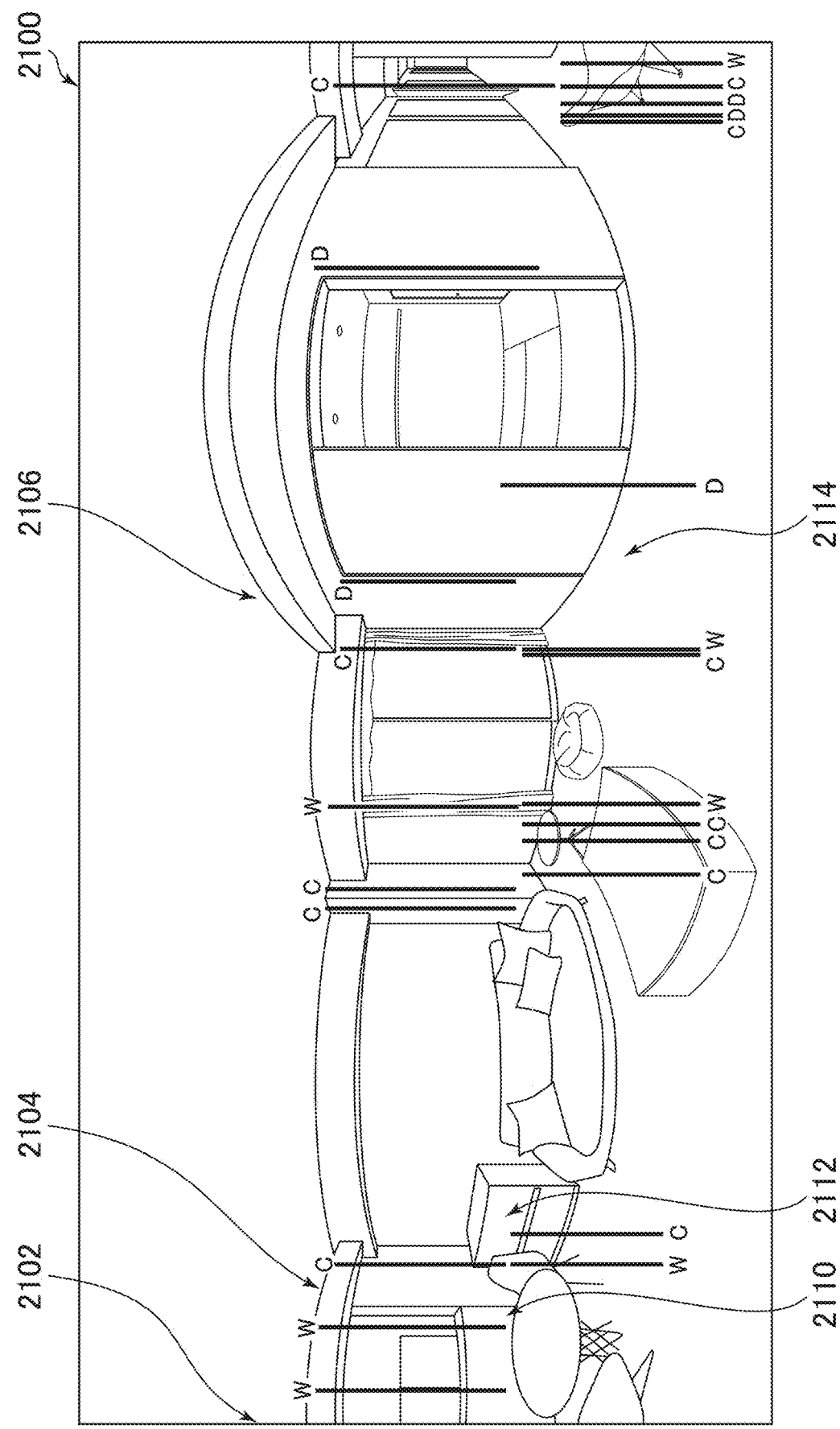
FIG. 18B shows detected objects according to a panoramic image and a point within the floorplan image.

In addition to detecting the object, the horizontal location of the object within the panoramic image is also determined. For example, the panoramic image 2100 of FIG. 18B shows vertical line 2102 which indicates a horizontal position of a left edge of a window, vertical line 2104 which indicates a horizontal position of a corner, and vertical line 2106 which indicates a horizontal position of a left edge of a door. The locations of the various objects (e.g. windows, doors and corners) is later used when data from the panoramic image is compared with data from the floorplan image.

Furthermore, the detected object may span more than a width of a pixel and therefore, a determination must be made as to where the location of the object will be designated. For example, if the object was a left edge of a window, this object may have been determined to span 10 pixels in a horizontal direction. Thus, if a precise location is to be ascertained, a rule or convention can be used to determine the location. Any number of methods can be used to designate the location of the left edge of the window. For example, the left most pixel, the right most pixel, the center most pixel, or a random pixel within the detected object could be designated as the location of the object.

In step 14 of FIG. 6, the object and its detected position in the panoramic image are encoded in the image or saved in a separate file. An example of this is shown in FIG. 18B, where the panoramic image 2100 is encoded with vertical lines 2102, 2104, 2106, etc. The vertical lines 2102, 2104 and 2106, and the single digit character located at the top of the vertical lines, indicate the position of the object within the panoramic image and the class of object detected, respectively. The class of object is illustrated by a character, C, W, D and corresponds to a corner, window and door, respectively.

The encoded data and saved data are used interchangeably and it is understood that either method could be implemented to preserve the detected object data.

Next, in step 16 a determination is made as to whether or not all of the panoramic images have been processed and encoded. If all of the panoramic images have not been processed, then the next panoramic image is selected in step 18 and the process returns to step 10 to begin processing the newly selected panoramic image from the beginning. Once it is determined that all of the panoramic images have been processed, the process ends.

Figure 8:
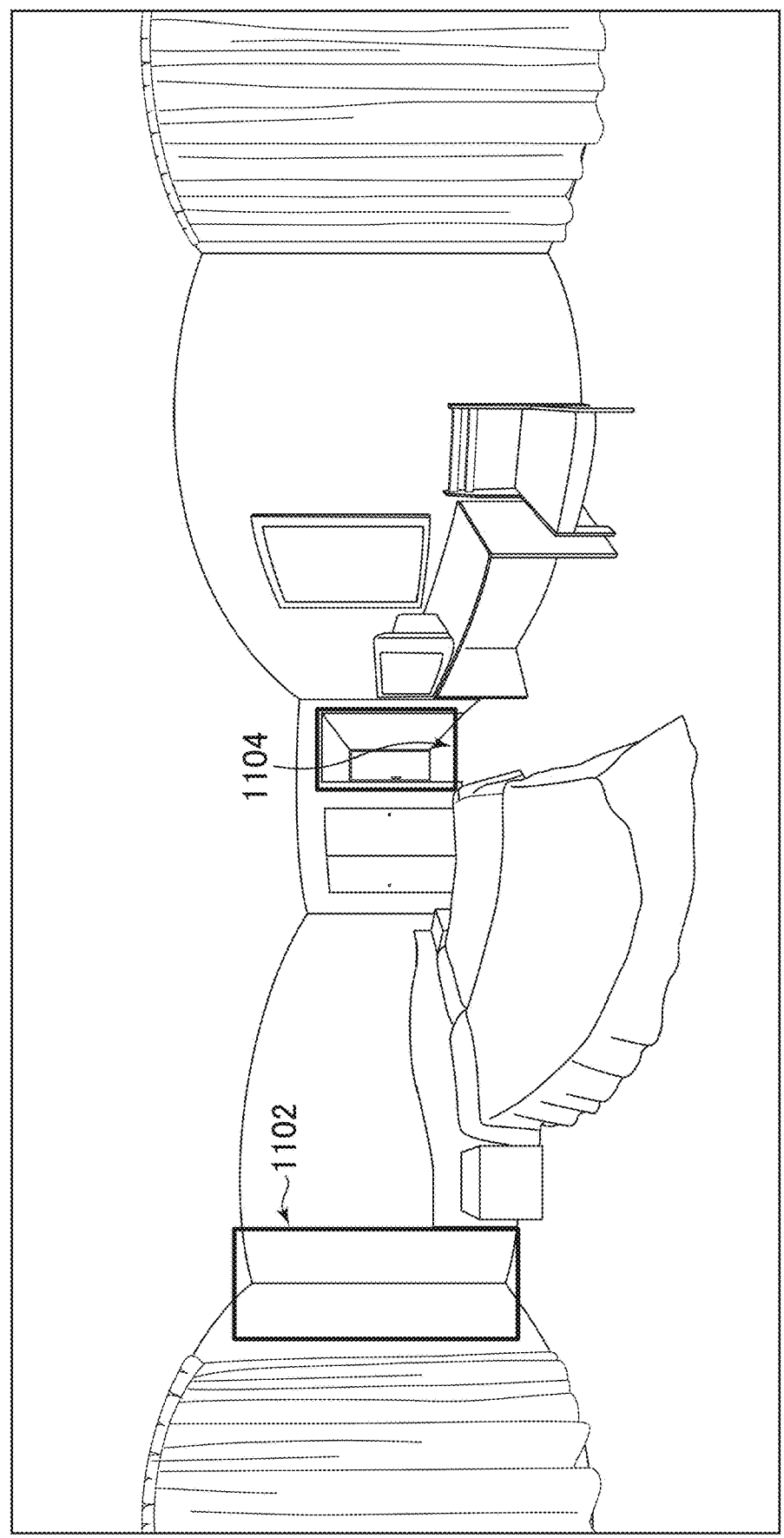
FIG. 8 shows an example of different objects being detected in a panoramic image.

FIG. 8 shows an example of detected objects in a panoramic image 1100, taken in a bedroom. In this example, a corner 1102 and a door 1104 are detected. While all of the objects are detected in panoramic room image 1100, for purposes of illustration, not all of the detected objects are labeled. In accordance with steps 12 and 14 of FIG. 6, both the class of object detected and the horizontal location of the detected object, within the panoramic image 1100, is determined and encoded in the panoramic image, or separately saved.

Figure 9:
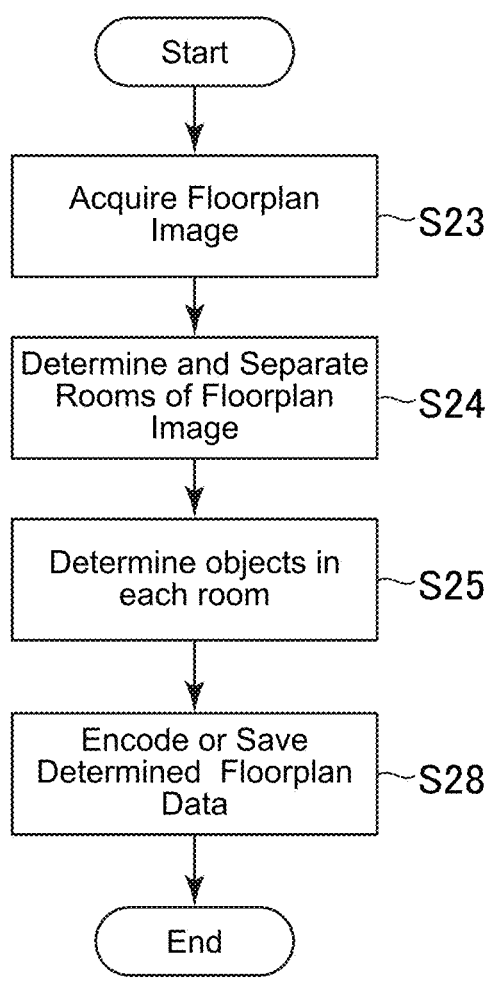
FIG. 9 shows a first method of determining rooms and objects based on an input floorplan image according to an embodiment of the invention.

FIG. 9 shows a method of acquiring, and analyzing a floorplan image 10 according to, an embodiment of the invention. As discussed previously, a floorplan image, such as floorplan image 10, is input into the computer system as shown in step 22 of FIG. 9. A floorplan image can be a representation of a floorplan of a building, house, apartment, boat, plane, train, etc., used to show the general layout of a building or area within a building.

As shown in step 24, the rooms of the floorplan image are determined and separated into their constituent elements. The rooms and objects of the floorplan image can be detected using a variety of techniques, including using a trained convolutional neural network (CNN) to segment the image. A brief discussion of using a CNN to determine the rooms in a floorplan image is discussed below. For a detailed discussion of using CNN's to detect objects, rooms, etc., in an image, please see U.S. patent application Ser. Nos. 15/798,349 and 15/798,343, the contents of which are incorporated by reference.

Figure 10C:
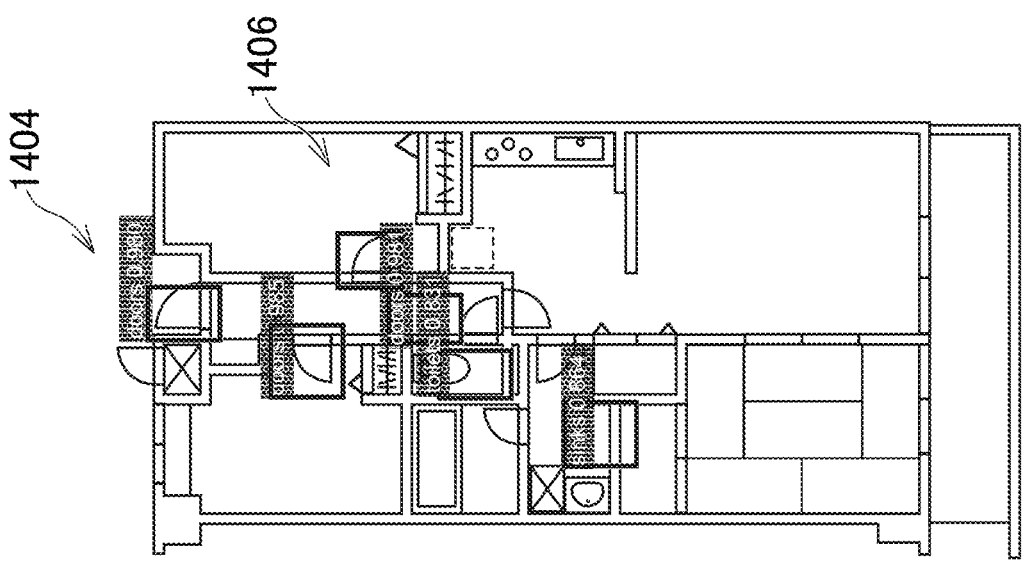
FIGS. 10A, 10B and 10C show an example of determining rooms and objects based on an input floorplan image according to an embodiment of the invention.
Figure 10B:
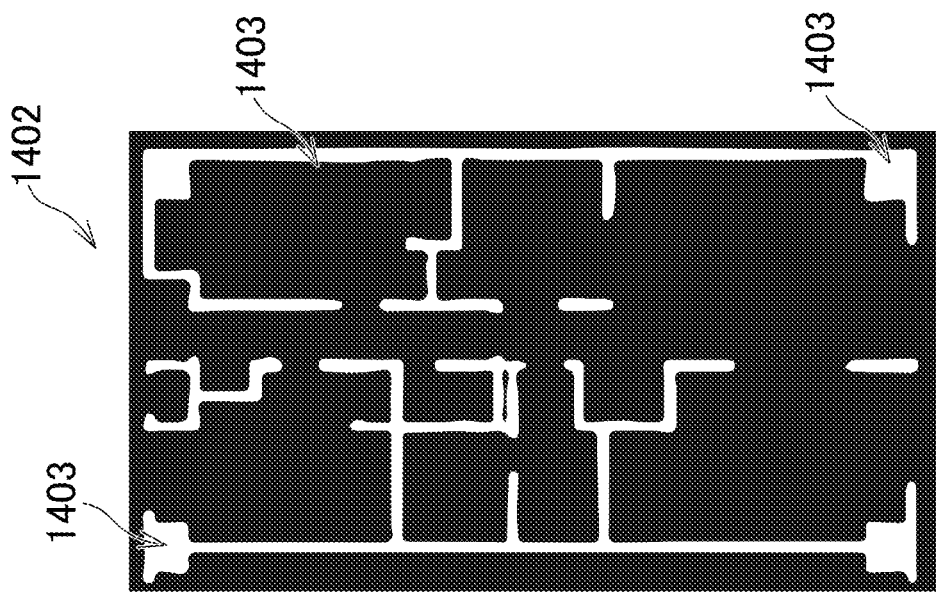
Figure 10A:
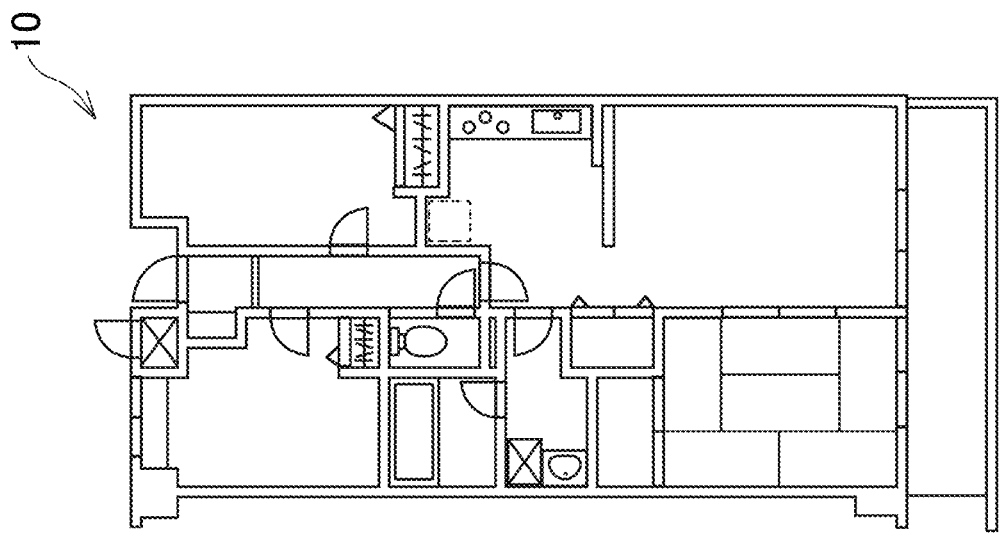

FIGS. 10A, 10B and 10C show an example of how individual rooms and objects can be accurately identified using only a floorplan image. First, a floorplan image 10 is input into the computer system. The computer system includes a CNN or uses a CNN or other image recognition and object detection apparatus, which detects walls, doors, windows, corners and/or other features of a floorplan image. One example of how a CNN can accurately detect rooms and features from a floorplan image, is by using a semantic segmentation technique. This is a technique where individual pixels in the floorplan image are given a probability of being a certain class of object, using a trained convolutional neural network. For example, a given pixel could be a wall, door, window, empty location, etc. The information regarding each pixel in the image is ultimately aggregated to ascertain the objects within the image.

An example of a segmented floorplan image is shown in FIG. 10B, by segmented floorplan image 1402. As shown in segmented floorplan image 1402, walls and windows 1403 are identified in white and empty locations are identified in black. In this example, doors are shown as being empty locations in the segmented image. Based on this segmented image, all rooms, hallways, doors, windows, corners and other locations in the original floorplan image can be identified. Each pixel in the original floorplan image has been identified and assigned as an object (or empty location) in the segmentation process.

In addition to using a CNN to identify features of a floorplan image, a character recognition system could also be employed. For example, some floorplan images may identify certain features by using written labels. These labels could then be read using optical character recognition (OCR). This OCR could be used alone or with data from the segmentation analysis. For example, if a floorplan feature was labeled "window" and recognized as such by the OCR, this could be compared with the result from the segmentation process to confirm that the OCR data matched with the segmentation data. If the data wasn't consistent, further steps could then be taken. Please refer to the applications incorporated by reference above for further discussion of using a segmentation and OCR technique.

Additionally, OCR could be used to determine the room type and match it with the room type that could be estimated from a panorama image (using a CNN classifier).

FIGS. 11A and 11B show an example of floorplan image 10 after the floorplan image 10 has been segmented and the individual rooms have been identified. Segmented image 1502 shows each room in the floorplan as being identified, while floorplan areas 1504 show the individual locations being separated and defined. As shown in FIGS. 11A and 11B, nine locations A, B, C, D, E, F, G, H and I are identified in floorplan image 10. Each of these locations are candidates for where a panoramic image has been taken.

With the segmentation process complete, the individual objects, such as doors, windows, corners, etc., can also be identified. (The individual objects can also be identified concurrent with the segmentation process. That is, as the floorplan image is determined, the objects in the floorplan image could be concurrently determined.) This is performed in step 25 as shown in FIG. 9. As each pixel in the semantic segmentation step has been labeled, determining the objects within a particular floorplan image and within a room or area of the floorplan image is easily ascertained based on the original segmentation.

As way of an aiding explanation of the process, the identified objects can be overlaid upon the original floorplan image to obtain a visual representation of where the objects are located with respect to each location in the floorplan image.

An example of a floorplan image where objects have been detected is shown in image 1404 of FIG. 10C. This image is output from the CNN and includes object labels and boxes highlighting the detected objects, which are overlaid on the input floorplan image 10. In addition to the object label, the CNN can also output a probability that the particular object is actually the stated object. For example, reference character 1406 is labeled as door in image 1404. The probability of reference character 1406 being a door is shown as 98.0%. For the purposes of this embodiment, the most likely object is used as the determined object. Thus, if reference character 1406 has a 98.0% probability of being a door and a 2.0% probability of being a window, the computer system will interpret the object as being a door. However, other embodiments could use a different threshold when determining objects. For example, if an object only had a 65% probability of being a particular object, the object may be ignored, or further analysis of the object could be performed to increase the likelihood of correctly identifying the object. Still other embodiments could use the raw probabilistic score of the object, as will be discussed later.

Finally, in step 28 of FIG. 9, the determined floorplan data is encoded in the floorplan image or is saved in a separate file.

Figure 12:
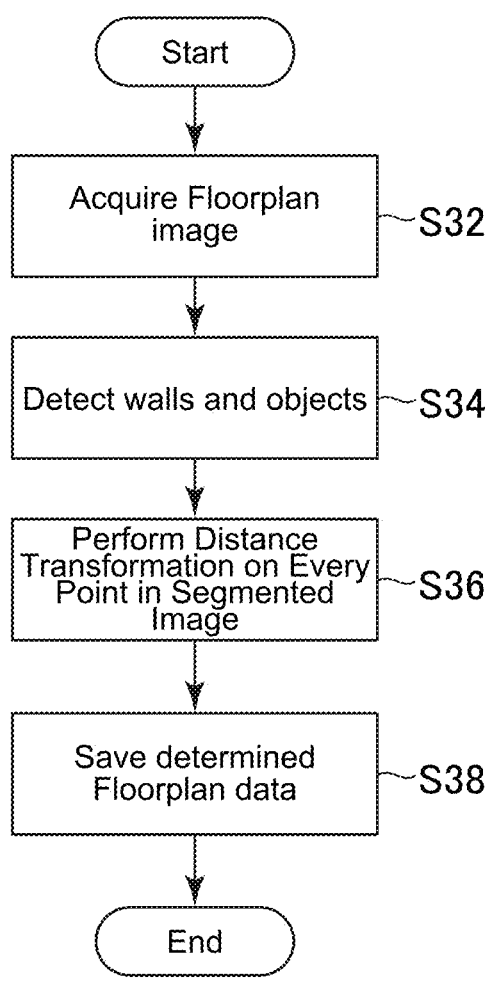
FIG. 12 shows a second method of determining walls, objects and performing a distance transformation based on an input floorplan image according to an embodiment of the invention.

FIG. 12 shows another embodiment of how a floorplan image can be used to ascertain a location of where a panoramic image was taken from. In the process shown in FIG. 12, step 36 can optionally also be performed in the process shown in FIG. 9. In FIG. 12, a floorplan image is acquired in step 32. In this embodiment, this is the same floorplan image as can be acquired in step 22 of FIG. 9. Once the floorplan image is acquired, the walls and objects of the floorplan image are detected in step 34. Here, a trained CNN or other optical object recognition tool can be used to detect the walls and objects in the floorplan image. The method of using the trained. CNN is the same method discussed above with respect to image 1402 of FIG. 10B.

Next, in step 36, a distance is calculated between each point in the segmented image and the nearest wall in the segmented image. This can be calculated using a distance transform method. An example of this technique is shown in FIGS. 13A, 13B and 13C. Starting from a segmented floorplan image 1402 in FIG. 13A, distances are calculated from each of the points in the segmented floorplan image to the nearest wall. Accordingly, for example, distances in the center of the room will have the highest values while distances near a wall will have the lowest value.

An example of a distance transform performed on a segmented floorplan image is shown in FIGS. 13B and 13C. Here a corresponding distance transform image 1604 is shown in FIG. 13B. The distance transform image 1604 shows distances with a higher value being a lighter color. Thus, the lightest colors are shown in the center of rooms. An example of a numeric representation of a distance transform for room 1602 is shown in numeric distance transform image 1606 of FIG. 13C. As shown in numeric distance transform image 1606, values of '0' are found nearest the walls of the room. This is because this area of the room is closest to a wall. Then areas with a 1 show the areas second closest to a wall, and so on. As shown in numeric distance transform image 1606, the area furthest from a wall is represented by a line of "5's" running vertically down the center of the room, parallel with the left and right walls. This line represents an area of the room which is the furthest away from a wall.

The areas in a room or floorplan image which are the furthest away from the walls, or other objects are also the area most likely to be used to take a panoramic picture. This is because, when taking a panoramic picture, a photographer generally positions herself/himself at the center of the room, so that the entire picture is proportional and no obstructing walls are blocking the view. That is, if the photographer was positioned near a wall, then part of the panoramic image would be a close-up view of the wall itself, which is undesirable.

However, it is not always possible to take a panoramic image from the exact center of a room. For example, a table could block this location and a photographer may therefore opt to stand next to die table instead of moving the table or standing on top of the table. This is just one example, but any number of reasons may cause the photographer to take the picture at a different location than the center of the room.

However, even when taking this into account, usually the best starting position in determining where a photographer has taken a panoramic image would be where the distance transform value is the highest. A more detailed discussion of how the panoramic image location is found, is discussed later.

As mentioned above, this distance transform step could also be applied to the process in FIG. 9 by performing the distance transform after the floorplan image was segmented.

Finally, in step 38 of FIG. 12, the distance transform data and object data is saved in an encoded floorplan image or in a separate file.

First Embodiment of Determining Panoramic Image Location and Orientation

Figure 14:
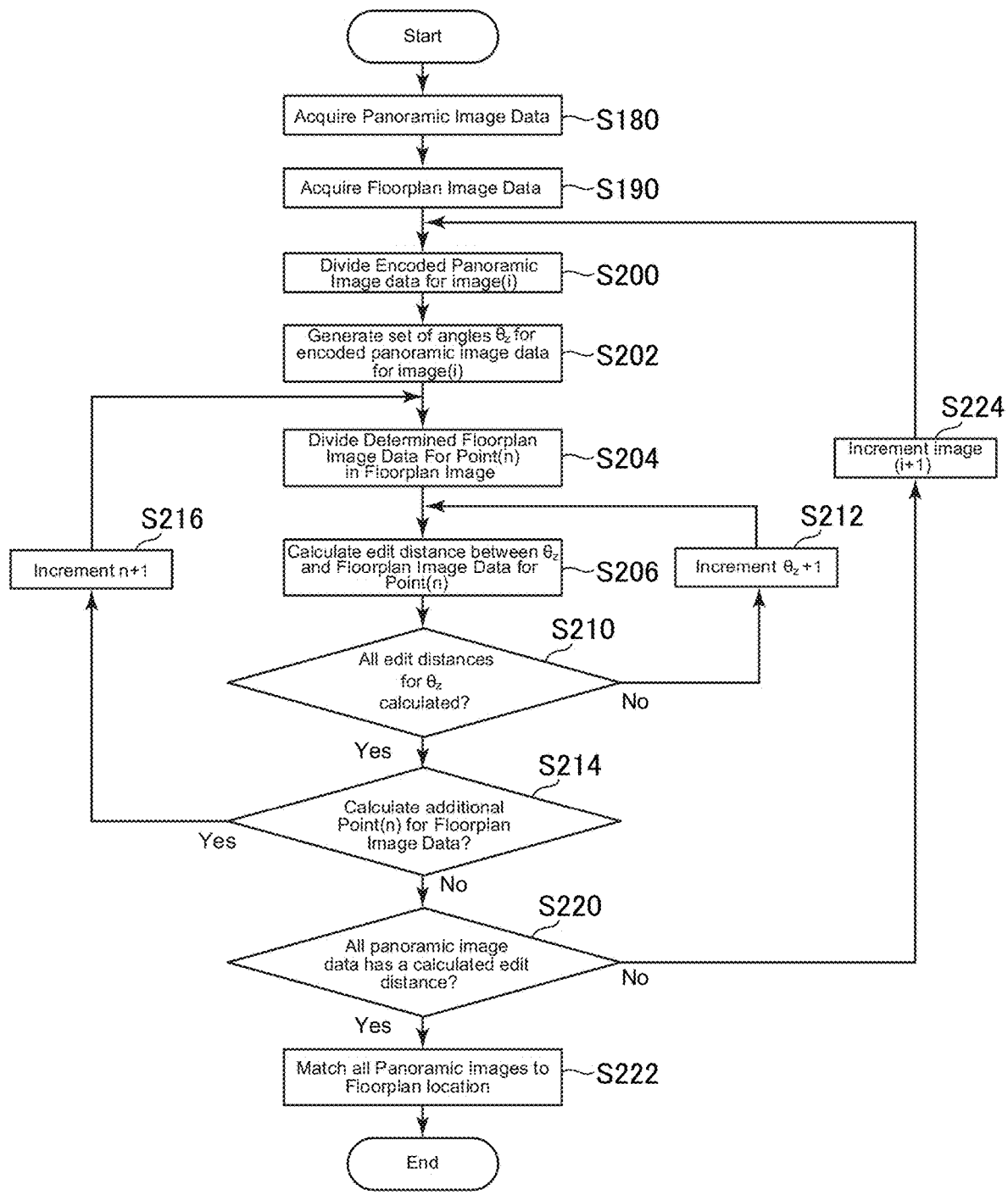
FIG. 14 shows a method of determining a location and orientation of where a set of panoramic images was taken with respect to a floorplan image, according to an embodiment of the invention.

A first embodiment of the process to determine a location and orientation of where each panoramic image was taken within a floorplan is shown in the flowchart of FIG. 14. This process is executed by computer system 1510.

Starting at step 180, the panoramic image data is acquired by the computer system 1510. This data includes the encoded data discussed with respect to FIG. 6. Next, at step 190, the floorplan image data is acquired by the computer system 1510. This data includes the encoded data discussed with respect to FIGS. 9 and 12.

At step 200 the encoded panoramic image with the object and location data is divided. An example is shown in FIG. 15A by character string 182. Character string 182 shows a row of 36 letters. Each column in the row represents an increment of 10° in the panoramic image. That is, when viewing a panoramic image with a 360° field of view, the image can be segmented into 10° increments. The letter in this 10° increment represents the class of the detected object within this 10° field of view.

For example, if a corner was detected within the 10° field of view, a 'C' would be indicated. If a door was detected in the 10° field of view, then a 'D' would be indicated. If a window was detected in the 10° field of view, then a 'W' would be indicated. If a wall, or no object was detected in the 10° field of view, then an 'A' would be indicated, for example. If two objects happened to be detected in the 10° field of view, then a mile or convention could be followed. For example, the first object detected could be used, a random selection could be made, the object with the highest probability according to the segmentation could be selected, etc.

As shown in FIG. 15A, character string 182 shows "AAAAA" to start the sequence. This indicates that a wall (or no object) was detected in each of the 10° increments in the field of view for 50°. Next, "CCC" is disclosed and this indicates that a corner is identified in each of the next 10° increments in a 30° field of view. This dividing of encoded panoramic image data is done for the entire field of view of the panoramic image. In the case of a 360° field of view, this is done for the entire image of 360°.

In the example shown in FIG. 15A, 10° increments are used to divide the image. However, this particular angular division is not necessary, and a smaller or larger angle could be used. For example, a 3°, 5°, 6°, 12°, 20°, etc., angle could be used. The larger the degree, or field of view, the less accuracy and less computation power required, and the smaller the degree, or field of view, the greater accuracy and greater computational power required.

After step 200 is completed, a set of angles is generated for the encoded panoramic image data in step 202. An example of this is shown in FIG. 15B by character string set 190. As shown in character string set 190, a total of 36 different angles, each separated by 10°, is created.

For example, when viewing a difference between row 0 and row 1 of character string set 190, row 1 is offset by a 10° increment. That is, the letters are shifted to the left by one column. As discussed above, in this example, each letter represents a field of view of 10°. Thus, the difference between each row and its adjacent row, is 10°. This is done for the entire field of view of the image, which in this example if 360°. Therefore, there are 36 rows of data for a 360° panoramic image in character string set 190.

In practical terms, the 10° shifting of the object data amounts to rotating the panoramic image by 10°. Thus, it is similar to standing where the panoramic image was taken, and adjusting a viewpoint in a left or right direction by 10°.

Once character string set 190 has been created, the encoded floorplan image data is divided and a character string for a single point in the floorplan, point(n), is created in step 204.

An example showing dividing the floorplan image data into segments and creating a character string is shown in FIG. 15A. Character string 186 shows a row of 36 letters. Columns in the row represent a 10° increment. That is, when viewing a 360° panoramic image, the image can be segmented into 36 increments of 10°. The character in this 10° increment represents the detected class of object within this 10° field of view.

For example, if a corner was detected within the 10° field of view, a 'C' would be indicated. If a door was detected in the 10° field of view, then a 'D' would be indicated. If a window was detected in the 10° field of view, then a 'W' would be indicated. If a wall, or no object was detected in the 10° field of view, then an 'A' would be indicated. If two objects happened to be detected in the 10° field of view, then a rule could be followed. For example, the first object detected could be used, a random selection could be made, the object with the highest probability according to the segmentation could be selected, etc.

As shown in FIG. 15A, character string 186 shows "DDD" to start the sequence. This indicates that a door was detected in each of the 10° increments in the field of view for the 30° field of view. Next. "CAC" is disclosed and this indicates that a corner is identified in the next 10° increment, followed by a wall in the next 10°, followed by a corner in the next 10° increment over this 30° field of view. This dividing and creating a character string of encoded floorplan image data is done for the entire field of view of the floorplan image data saved in step 28 of FIG. 9. In the case of a 360° field of view, this is done for the entire image.

It is important to note that depending on where the viewpoint is located in the floorplan image data, the character string 186 will change. An example of this is shown in FIGS. 18A and 18B. For a given point 2140 located within a room or area of the floorplan image 10, a 360° map can be made of where each object is located if the perspective was rotated about the given point 2140. In the example shown in FIG. 18A and FIG. 18B, detected objects 2110, 2112 and 2114 are indicated by vertical lines which are labeled with a class of object, C, D, or W, representing a corner, door, or window respectively. The detected objects also have a spatial position relative to one another which represent the detected objects when viewing them from the given point 2140.

A second set of vertical lines shown below the first set, represent the objects detected in the floorplan image at point 2140 in FIG. 18A. Vertical lines 2110, 2112 and 2114 represent the objects detected in the floorplan image. As discussed previously, the location of the objects detected using the floorplan image can change relative to one another depending on the point at which they are observed. Please see the discussion with respect to FIGS. 19A, 19B and 19C. Thus, changing the position of the observance point in the floorplan image necessarily changes the positioning of the detected objects.

While the position of the detected objects is subject to change, the ordering of the detected objects with respect to one another will generally not change. That is, if a first door (D), second door (D), first corner (C), and second corner (C), represented by the letters DDCC are detected in that order, from left to right, the relative angles between these objects are subject to change with a shifting viewpoint. However, the order of the objects themselves will generally not change. That is, with differing viewpoints, the objects may appear in the order of CCDD, DCCD, CCDD and CDDC, but the objects will never appear in the order of DCDC or CDCD, for example.

At point 2140 of FIG. 18A vertical lines 2110, 2112 and 2114 represent the detected objects, which are overlaid upon the encoded panoramic image 2100. In practice, once data from the panoramic image has been obtained, the panoramic image is not needed again for this step. All that is required is the detected objects of the panoramic image, not the panoramic image itself. The panoramic image is provided for illustrative purposes to aid in the description of how the location where the panoramic image was taken, is determined.

Looking at FIG. 18A, if the point 2140 was moved within the room to point 2150, the angular distances between the objects in the room, for both the panoramic image and the floorplan image, would change accordingly. If viewing this change of position in real time, one would see the vertical lines representing the objects (e.g. 2110, 2112 and 2114) moving horizontally about the image, stretching and squeezing depending, on the angle the objects are being viewed from.

Figure 19A:
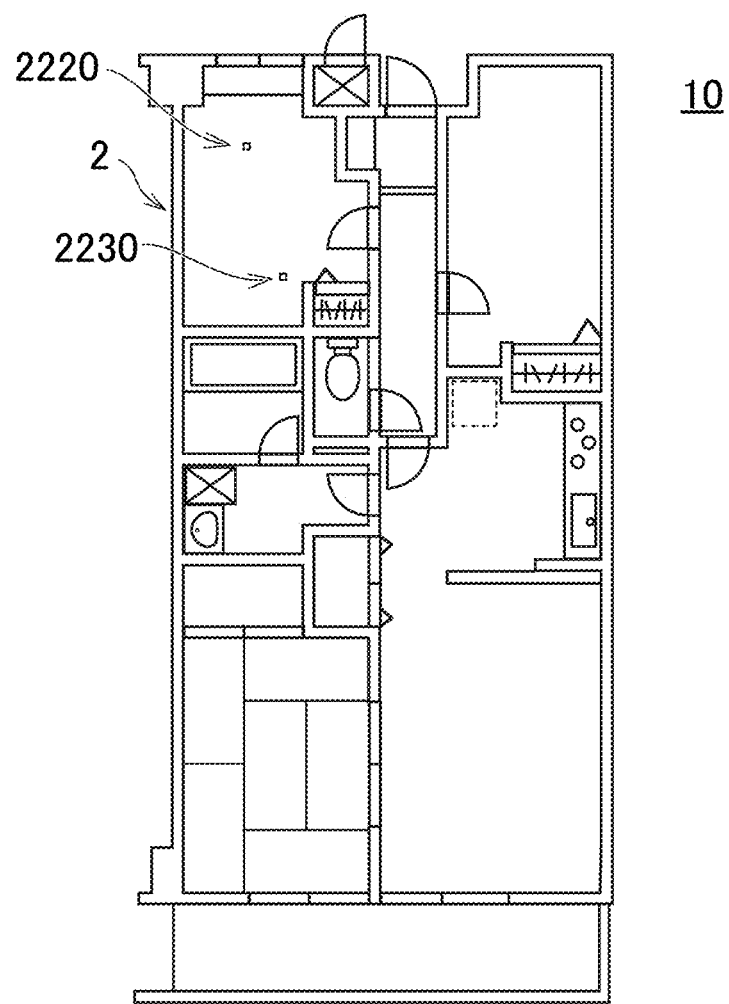
FIG. 19A shows a floorplan image with two identified points within the floorplan image which correspond to FIGS. 19B and 19C.
Figure 19B:
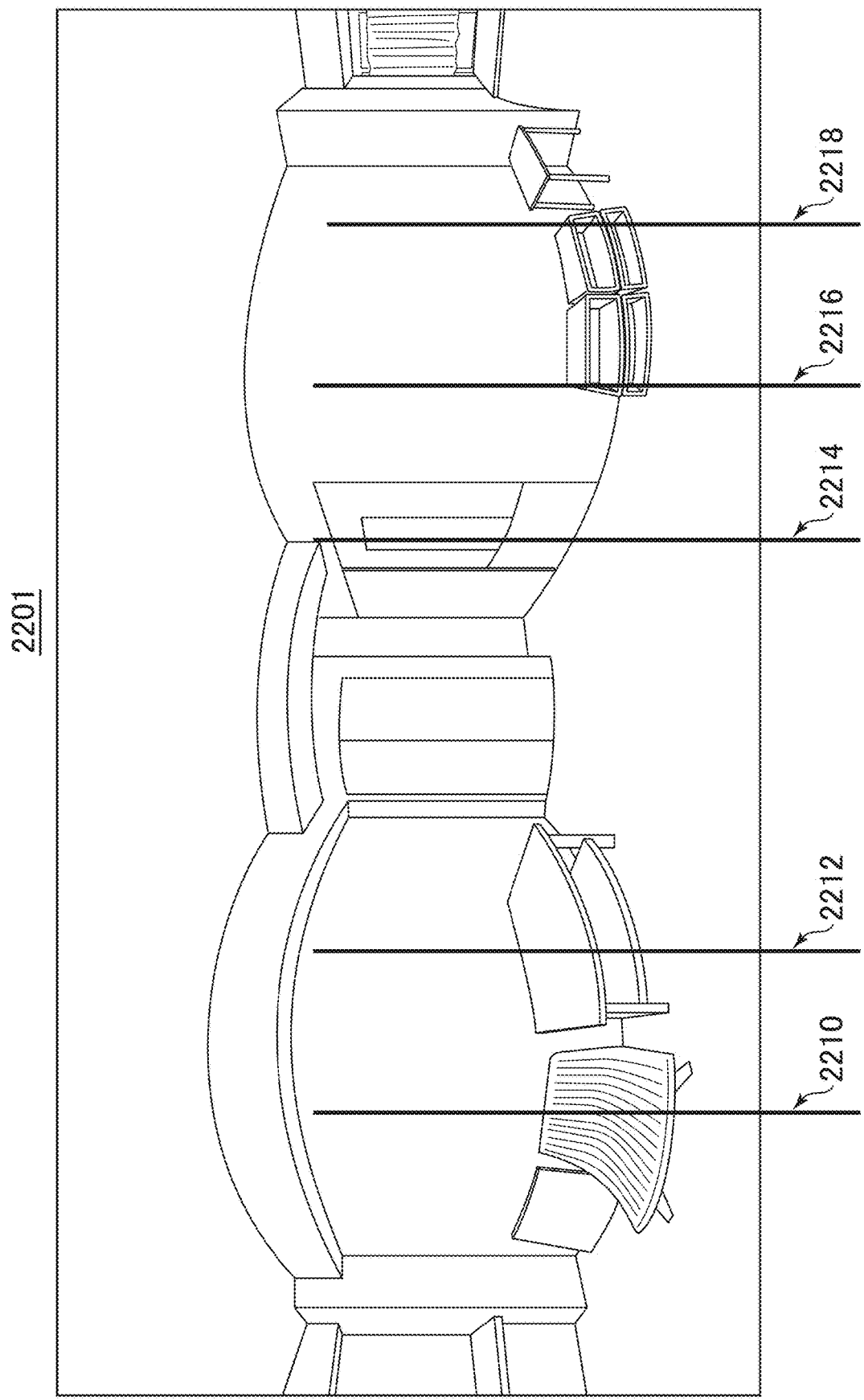
FIG. 19B shows a visual representation of objects detected within the floorplan image and the apparent location of the detect objects when viewing the detected objects from a first point within the floorplan image according to FIG. 19A.
Figure 19C:
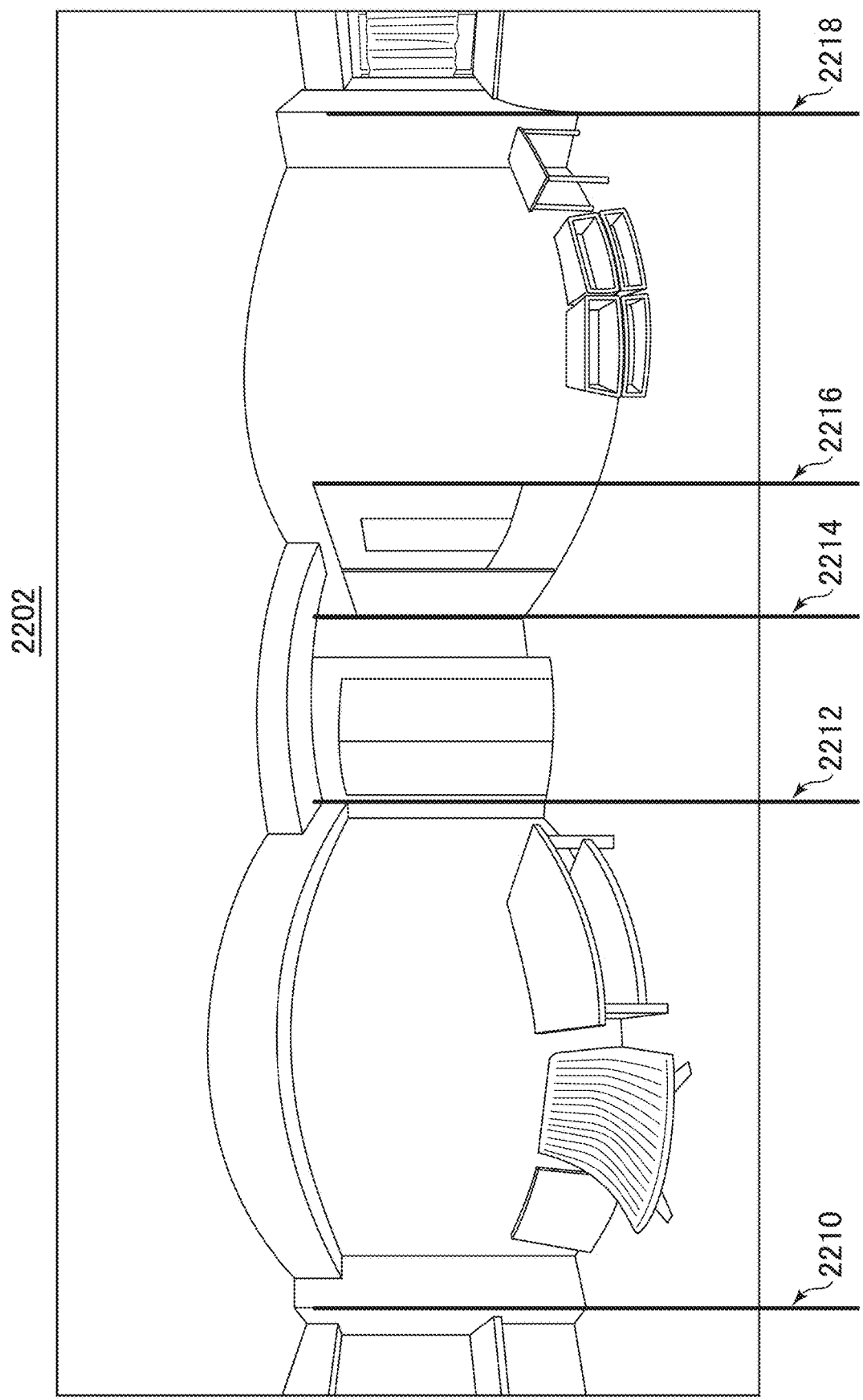
FIG. 19C shows a visual representation of objects detected within the floorplan image and the apparent location of the detect objects when viewing the detected objects from a second point within the floorplan image according to FIG. 19A.

An example is shown in FIGS. 19A, 19B and 19C. FIG. 19A shows floorplan image 10 and bedroom 2. Within bedroom 2 are two points, 2220 and 2230. Based on the objects determined and saved in step 28 of FIG. 9, a representation of the objects in bedroom 2, when viewed from point 2220, can be created, as shown in FIG. 19B. The image 2201 shows the vertical lines 2210, 2212, 2214, 2216 and 2218, representing detected objects, along with the angular distances separating them, overlaid on the corresponding panoramic image. At this point, the correct panoramic image which corresponds to the correct location in the floorplan at which the panoramic image was taken, is not yet known.

As the position 2220 is changed to position 2230, shown in FIG. 19A, the apparent location of the objects is also changed as shown in image 2202 in FIG. 19C. The same vertical lines 2210, 2212, 2214, 2216 and 2218 exist, indicating the same detected objects, but their angular relationship amongst one another has changed. This is because the position of the point 2230 is different than the position 2220 and thus the relative geometries of the detected objects also changes as the viewpoint from within the room is changed.

The first point(n) that is chosen can be a point in a center of a room. As discussed in step 36 of FIG. 12, a distance transform value can be used to determine where a center of the room is located. This will be the area with the highest distance transform value.

Returning to FIG. 14, in step 206, the character string for a point(n) in the floorplan image data is compared with the character string $\theta_z$, where z represents the row of data in the character string set 190. Thus, for example, the first character string $\theta_z$ to be compared is row 0 of character string set 190, as shown in FIG. 15B.

Figure 16:
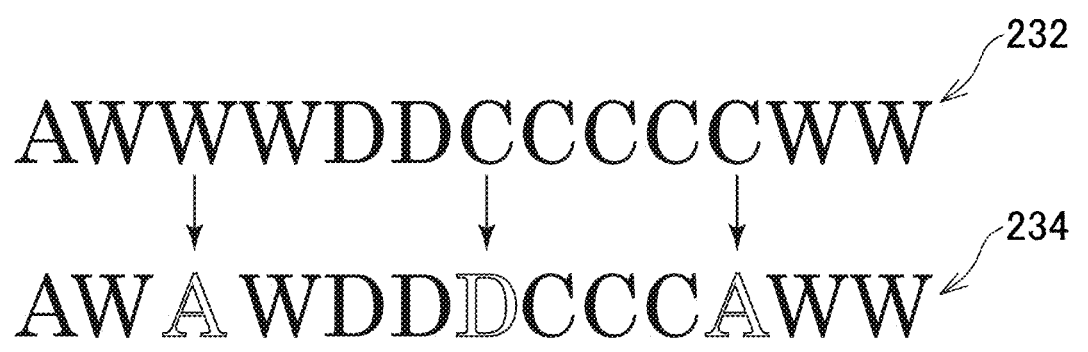

For this comparison of data, an edit distance is calculated. An example of this is shown in FIG. 16. As shown in FIG. 16, a first character string of 13 letters 232 are compared against a second character string of 13 letters 234. In the example in FIG. 15A, sets of 36 letters would be compared to one another, however for explanatory purposes, only 13 letters are compared in this example.

To calculate the edit distance, any letters that don't match with the letter in the corresponding location, have a positive value associated with them. For example, this value could be one. For letters that match with the letter in the corresponding location in the compared character string, the edit distance is zero. The difference values for a set of character strings is then added together to get the edit distance. Thus, when calculating the edit distance for first character string 232 with second character string 234, the answer is three. This is because three letters between the respective character strings do not match with each other.

In step 210 a determination is made as to whether all of the edit distances have been calculated for each character string in the character string set 190. If all of the edit distances in each row of character string data have not been calculated, the character string $\theta_z$ is incremented by 1 in step 212 and the next set of edit distances are calculated. This is repeated until all of the character strings in the character string set 190 have been compared with the character string for the point(n) of the floorplan image.

Once all of the edit distances for character string set 190 have been calculated in step 210, a determination is made as to whether an additional point(n) in the floorplan image should be compared with character string set 190, in step 214.

For example, the determination to continue comparing different points(n) could be made if the edits distance for all of the points(n) compared to the character string set 190 are large. As discussed above, if the edit distance is large, this would indicate that the location of point(n) was not close to where the panoramic image was taken, and additional points (n) need to be analyzed. A large edit distance could be a threshold value, such as over 90% of the characters don't match, or over 80% of the characters don't match, or over 70% of the characters don't match, or over 60% of the characters don't match, or over 50% of the characters don't match, or over 40% of the characters don't match, or over 30% of the characters don't match, or over 20% of the characters don't match, or over 10% of the characters don't match.

Alternatively, a determination could be made not to compare any additional points(n) if the edit distance of the previous point(n) was small or below a threshold amount. A small edit distance could be a threshold value, such as over 90% of the characters match, or over 80% of the characters match, or over 70% of the characters match, or over 60% of the characters match, or over 50% of the characters match, or over 40% of the characters match, or over 30% of the characters match, or over 20% of the characters match, or over 10% of the characters match.

Another method of determining if edit distances for additional points(n) need to be calculated is to calculate an edit distance gradient for several points(n) of the floorplan image and then determine a local minimum distance for a particular room in the floorplan image. After calculating an edit distance at a starting point(n), an edit distance for adjacent points(n) in the floorplan image could also be calculated. Looking at these edit distances together, an edit distance gradient could be created. This method reduces processing power on the server, because by using the edit distance gradient, a local minimum can be found and no additional points(n) need to be calculated. If a local minimum was not found, then additional points(n) could be analyzed.

It is noted that the above calculated edit distance is for a particular room or area in the floorplan image. However, this process of calculating local minimums of edit distances could be repeated for one or more, or all of the rooms areas in the floorplan image. For example, as shown in FIGS. 11A and 11B, if the first location or room in the floorplan image to be compared against was room A, then the next location be compared against would be room B, and then room C and so on until each room or area in the floorplan image was compared against each panoramic image.

Another method of determining if edit distances for additional points(n) in the floorplan image need to be calculated, is to use the locations from the distance transform data as a starting point and perform an edit distance calculation at a random Gaussian sample of points(n), located around the starting point(n), for a particular room. As the starting point(n) is a likely candidate for producing a small edit distance, and the surrounding points are the next mostly likely points(n) to produce a small edit distance. This method reduces processing power on the server because it takes advantage of an inherent desired location when taking a panoramic image, namely, near the center of the area photographed, to quickly find the location where the panoramic image was taken. Once all of the distances for the points(n) in the random Gaussian sample are calculated, the point(n) with the smallest edit distance is used.

It is noted that the above calculated edit distance is for a particular room or area in the floorplan image. However, this process of calculating local minimums of edit distances could be repeated for one or more, or all of the rooms areas in the floorplan image. For example, as shown in FIGS. 11A and 11B, if the first location or room in the floorplan image to be compared against was room A, then the next location be compared against would be room B, and then room C and so on until each room or area in the floorplan image was compared against each panoramic image.

As can be seen from the above, any number of techniques used to determine whether or not to continue calculating edit distances can be used in keeping with the scope of the embodiment of the invention.

If additional points(n) are to be calculated, n is incremented by 1 in step 216 and the process returns to step 204 to begin analysis at another point in the floorplan image. If additional points do not need to be calculated, then the process proceeds to step 220.

Next in step 220, a determination is made as to whether each edit distance has been calculated for each panoramic image, if the answer is no, then the image number (i) is incremented by one in step 224, and the process repeats with another panoramic image, beginning again at step 200. An example of a character string for a different panoramic image is shown by character string 184. As shown in FIG. 15A, each panoramic image has its own character string.

If the answer is yes in step 220, then a determination is made in step 222 where each panoramic image is matched to a corresponding location in the floorplan image, along with a direction in which the panoramic image was taken.

The matching in step 222 is performed by finding a lowest overall cost (described below) of each location and orientation in the floorplan image and each corresponding panoramic image. For example, the total combination of floorplan locations and corresponding panoramic images, with the lowest combined edit distance, can be chosen as the best combination. An example of this feature is shown in FIG. 20.

FIG. 20 shows a distance matrix of edit distance values of pairs of panoramic images and floorplan locations. The panoramic images are numbered 1-9 and shown in the x-axis while the floorplan locations are numbered 1-9 and shown in the y-axis. Each of the numbers in the matrix shows an edit distance for the corresponding panoramic image and floorplan location. Further, the numbers in the matrix show the lowest edit distance for each panoramic image set. That is, the matrix shows the lowest edit distance when accounting for the optimal rotation of the image. From the matrix, the combination of pairings (floorplan location and panoramic image) that has the lowest edit distance can be determined.

In the example shower in FIG. 20, the total lowest edit distance can be added up (5+9+10+4+9+8+7+12+10) for a total distance of 74. This is found in the left to right downward diagonal row. It is noted that the diagonal row is not necessarily the lowest edit distance and the optimal combination of floorplan locations and panoramic image matching could be mixed up in the matrix, as long as each floorplan location has one best match and each panoramic image has one best match. Thus, when determining where each of the panoramic images 1-9 were taken, the lowest edit distance, which equates to the best object matching, is 74. As shown in FIG. 20, panoramic image 1 was taken at floorplan location 1, panoramic image 2 was taken at floorplan location 2, panoramic image 3 was taken at floorplan location 3, and so on.

Additionally, the matching angle for each location is also shown at the bottom of the distance matrix. The matching angle is shown for each of the panoramic images 1-9. That is, the matching angle for the first panoramic image is 190°, the matching angle for the second panoramic image is 90°, the matching angle for the third panoramic image is 90°, and so on. This angle indicates the umber of degrees the panoramic image must be rotated to have the best match and lowest edit distance score.

Figure 17:
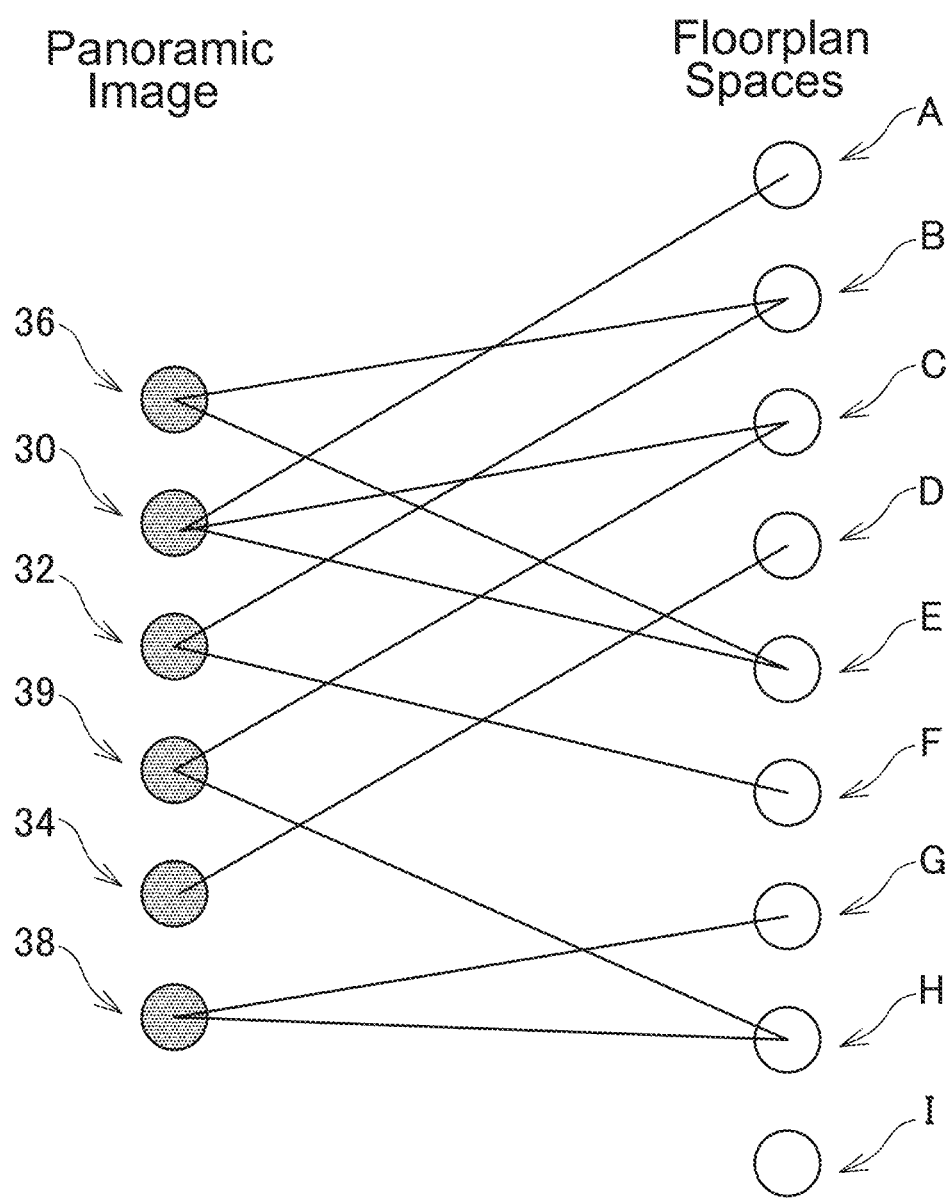
FIG. 17 shows a bipartite graph providing an example of possible matches of panoramic images to floorplan locations, based on calculated edit distances.

A visual representation f matching the panoramic images with a corresponding location in the floorplan is illustrated in the bipartite graph in FIG. 17. As shown in FIG. 17, panoramic images 30, 32, 34, 36 38 and 39 are shown with lines connecting them to different floorplan locations, A through I. These lines represent the lowest edit distances between a panoramic image and a floorplan location. As discussed above, the panoramic image and locations pairings with the overall lowest edit distances can be paired together to correspond a panoramic image with a location in a floorplan image.

Second Embodiment of Determining Panoramic Image Location and Orientation

Figure 21:
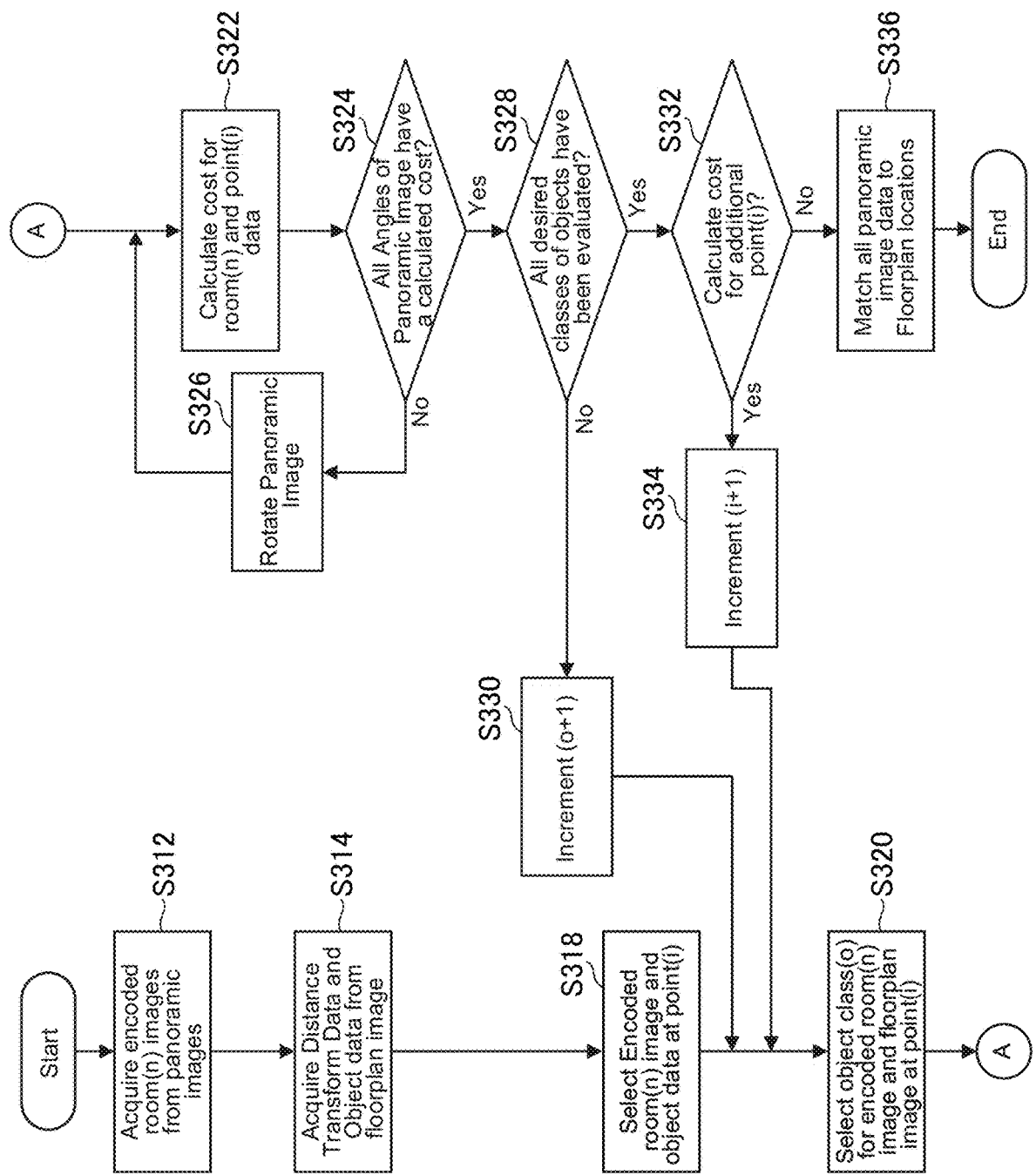
FIG. 21 shows a method of determining a location and orientation of where a set of panoramic images was taken with respect to a floorplan image, according to an embodiment of the invention.

A second embodiment of how a determination is made as to where a panoramic image was taken with respect to a floorplan location, and also how a determination is made with respect to the orientation of the panoramic image, is shown in FIG. 21.

As shown in step 312 the encoded panoramic images and data are first acquired by computer system 1510. Next, in step 314, the distance transform data and object data from the floorplan image is acquired by computer system 1510. This detected objected data includes the type of class of detected object and location of the detected object and may also include the probabilistic data of the detected object, as discussed above.

Next a specific panoramic image, with the encoded object data of room(n) is selected for analysis in step 318. Additionally, the floorplan object data for a specific point(i) is also selected in step 318. In a first iteration of the process in the flowchart shown in FIG. 21, the specific point(i) can be chosen based on the distance transform data. Thus, a center position of a space in the floorplan image can be chosen as a first point, as it is a most likely candidate where the panoramic image was taken.

In step 320 a specific object class(o) is chosen. For example, an object class can be windows, left windows, right windows, doors, left doors right doors, corners, concave corner, convex corner, etc. Any detectable class of objects can be chosen. For a first iteration of the process, the class with the most objects can be chosen, although any class, including an arbitrary class could also be chosen. All other classes of objects that were not chosen can be ignored and used in future steps. Thus, if the chosen class of objects is doors, then only door data for the panoramic image and door data for the floorplan image will be compared with one another. One technical advantage of selecting only one object class is that it reduces the amount of computational power required by CPU 1520 to determine panoramic image locations and orientations.

Figure 22:
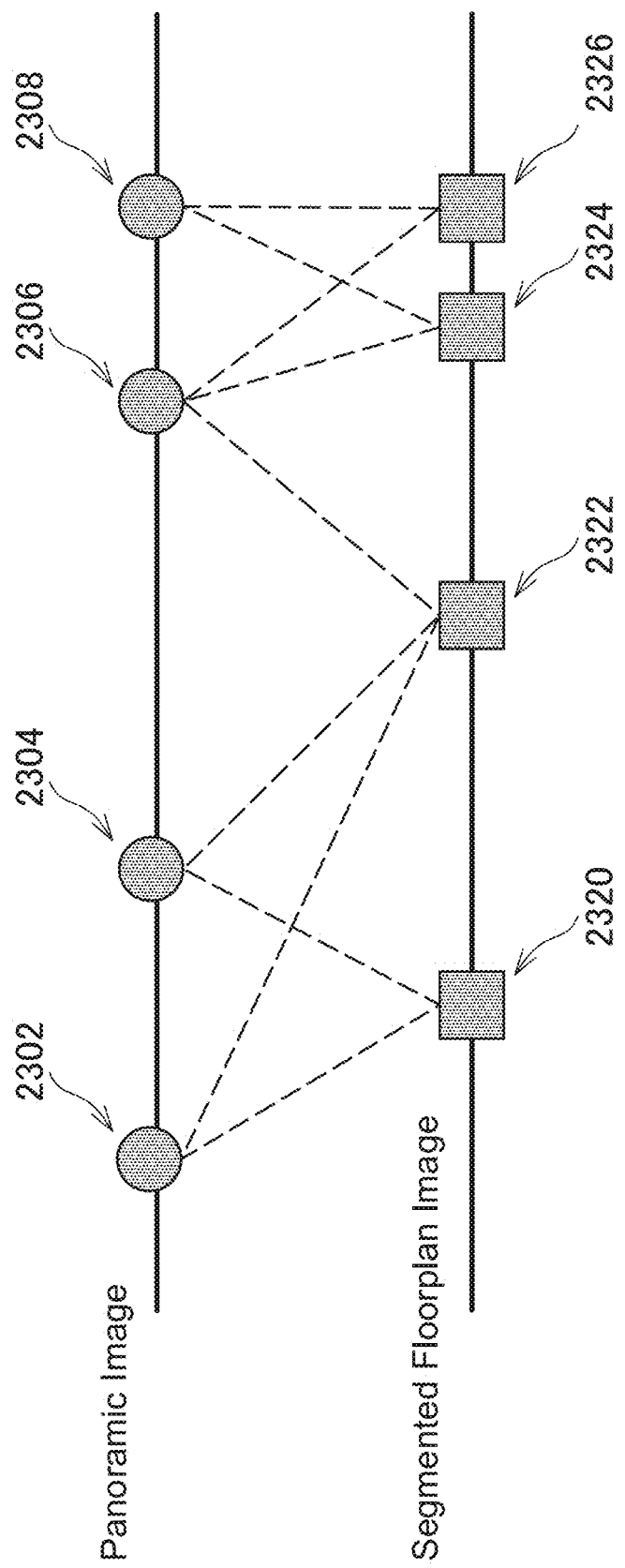
FIG. 22 shows a method of measuring a distance between objects detected in a panoramic image and objects detected in a floorplan image.

In step 322, a comparison is made of the panoramic room(n) data with the floorplan data at point(i), with respect to the selected class of objects. An example of this is shown in FIG. 22. FIG. 22 shows two lines, a top line for the panoramic image and a bottom line for the floorplan image. These lines represent a horizontal axis of the room or space in the floorplan image or panoramic image.

Objects 2302, 2304, 2306 and 2308 represent detected objects of the specified class and their respective location in the panoramic image with respect to the horizontal direction. Objects 2320, 2322, 2324 and 2326 represent detected objects of the specified class and their respective location in the floorplan image, at point(i), with respect to the horizontal direction. Thus, the objects in FIG. 22 could represent doors, with FIG. 22 showing where doors were detected in the panoramic image and in the floorplan image.

A cost is then computed for each of the objects in a specific image; e.g. the floorplan image or the panoramic image. The cost is determined by calculating a distance between the specific object under consideration and its closest neighbor in the image that it is being compared to. Thus, for example, object 2302 of the panoramic image is closest to object 2320 of the floorplan image. However, to be sure that the distance to the closest object was determined, at least one other distance measurement can be performed. Thus, the distances between object 2302 and object 2320, and object 2302 and object 2322 are determined. The shortest distance is then recorded. This is done for each of the objects in the image. This can be expressed mathematically by the following equation:

$$C(X, Y) = \sum_{\substack{x \in X \\ y=\text{argmin}_{y \in Y} |x-y|}} d(x, y) \quad \text{Equation 1}$$

In the equation above, C represents the cost function, X represents a set of points extracted from a floorplan image, corresponding to an object class, and Y represents a set of points extracted from a panoramic image, corresponding to an object class.

Additionally, the same distance calculation can be performed for each of the objects in the other image. That is, the distance between objects 2320, 2322, 2324 and 2326 and their nearest neighbor object in the panoramic image can also be calculated. The respective costs for the distances for all of the objects in both images can then be added up to determine the local total cost for the object class with respect to the panoramic image and the point(n) of the floorplan image.

Figure 23B:
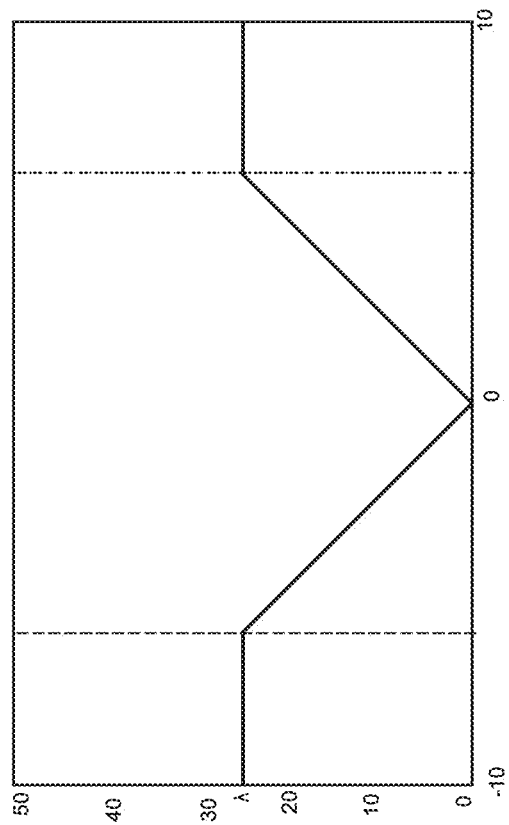
FIGS. 23A and 23B show weighting functions that can be used with a distance calculation.
Figure 23A:
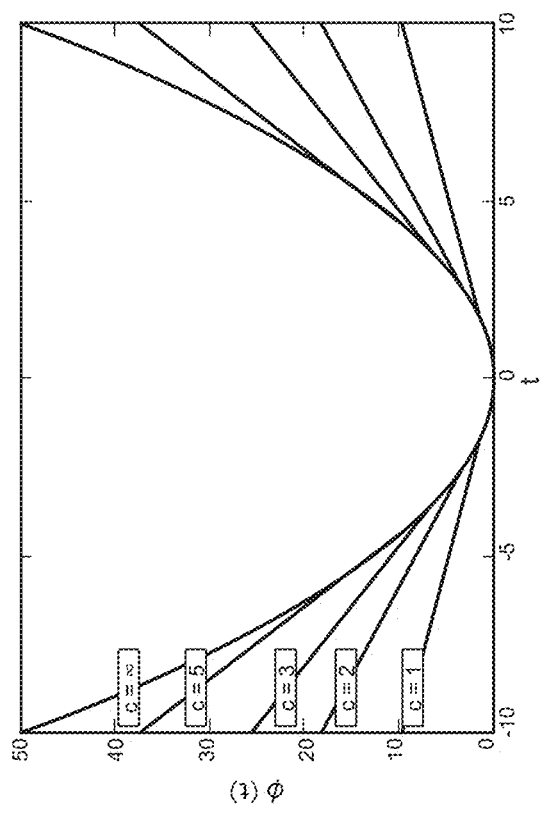

Additionally, assessing the cost could also involve a weighting factor and/or thresholding process as described below. As shown in FIGS. 23A and 23B, two graphs provide a weighting/thresholding element to determining the cost with respect to a distance between two objects in the same class. Looking at FIG. 23A, it shows that as the distance between points increases, the corresponding cost also increases, but depending on how far the distance is, the corresponding cost is either based on a quadratic, or linear function.

For example, FIG. 23A shows a Huber function where the cost function is quadratic near the zero point, but the cost function is linear outside of the area near the zero point. This weighting of the cost reduces the penalty for outliers. Thus, large distances between points incur less of penalty than they would otherwise. It also keeps the cost low for small distances between points.

This can be represented mathematically shown by the equations below:

$$G(x) = \frac{x^2}{(2c)} \text{ for } |x| \leq c \quad \text{Equation 2}$$

$$G(x) = |x| - \frac{c}{2} \text{ for } |x| > c \quad \text{Equation 3}$$

In this equation, G(x) is a robust distance, x is a distance between two objects and, c is a constant.

A second example is shown in FIG. 23B which shows a linear cost for distances up to a certain threshold λ and then a fixed cost of λ for distances further than. This can also be represented mathematically by the following equation:

$$d(x, y) = \begin{cases} |x - y|, & \text{if } |x - y| < \lambda \\ \lambda & \text{otherwise} \end{cases} \qquad \text{Equation 4}$$

In this equation, d is the distance between two points, and x, y, and λ are constants. Specifically, x and y are positions of objects in a panoramic image and floorplan image. This cost function limits outlier costs so as not to overwhelm the comparison. One advantage of this equation is that it reduces the amount of computation power required by the computer system 1510.

As an alternative to the process for step 322 described above, another method can be used to determine the distance between objects in the panoramic image and the floorplan image. Specifically, the probabilistic output of a CNN, can be used in detecting objects in both of the panoramic image and the floorplan image. As mentioned previously, a CNN can output a probability that any given pixel is a particular object.

Taking the panoramic image as an example, the CNN can classify the likelihood of a pixel being a particular object, from 0% to 100%. For example, a particular pixel may have a 5% likelihood of being a door, a 50% likelihood of being a corner, a 25% likelihood of being a window and a 20% likelihood of being a wall. This is done for each horizontal location/pixel. Thus, if the image contained 1080 pixels in a horizontal direction, each of the pixels could have a particular probability of being an object, as output by the CNN. Further, if any of the pixels in a vertical column of pixels are determined to be an object, then every pixel in the vertical column can be represented by the determined object. Therefore, only pixels in a horizontal row need to be analyzed. One advantage of this method is that it reduces the amount of computation power required by the computer system 1510.

The probabilistic output of a CNN can also apply to the floorplan image as well. For example, a particular pixel may have a 15% likelihood of being a door, a 40% likelihood of being a corner, a 15% likelihood of being a window and a 30% likelihood of being a wall. And similar the panoramic image, this is done for each horizontal location/pixel. Thus, if the image contained 1080 pixels in a horizontal direction, each of the pixels could have a particular probability of being an object, as output by the CNN. Further, if any of the pixels in a vertical column of pixels are determined to be an object, then every pixel in the vertical column can be represented by the determined object. Therefore, only pixels in a horizontal row need to be analyzed. One advantage of this method is that it reduces the amount of computation power required by the computer system 1510.

If the object class being compared was doors, for example, then the probability of the pixel being a door in the panoramic image would be compared to the probability of the pixel in the same position in the floorplan image also being a door. Thus, if the pixel had a 5% likelihood of being a door in the panoramic image and had a 15% likelihood of being a door in the floorplan image, then the difference in probabilities is determined to be 10%.

This procedure is performed for each pair of pixels (in the panoramic image and in the floorplan image), until all of the pixels in a horizontal line on the panoramic image and floorplan image have a probability difference calculated between them. The difference in probability can then be added to together to determine a local cost; i.e. a cost for a given class of objects at a particular point(i) in the floorplan image and for a particular panoramic image room(n).

The process is then repeated for different classes of objects. This can be done for one or more classes of objects, including all classes of objects. The differences in probability are determined for each class of object that is compared. The differences are then added up to determine a local cost for each class of compared objects.

Once all the costs for the compared classes of objects have been added together (i.e. adding all of the local costs), a global cost can be determined. The global cost is a cost of all the local costs added together. The lowest total cost for the particular point(i) in the floorplan image and the panoramic image room(n) can then be saved and compared to other costs for different points(i) and different panoramic room(n) images. These additional panoramic images and points in the floorplan will be calculated later in the process and discussed in more detail below. The above probabilistic differences method can be represented mathematically as shown below:

$$C(\text{det}_{floorplan}, \text{det}_{panoramic}) = \sum_p d(\text{det}_{floorplan}(p), \text{det}_{panoramic}(p)) \qquad \text{Equation 5}$$

In this equation, C is the cost function, $\text{det}_{floorplan}$ are the output values of detected objects in floorplan image and $\text{det}_{panoramic}$ are the output values of detected objects in the panoramic image.

As can be understood from above, any number of methods of weighting distances and determining a cost between object pairs can be used and are within the scope of this embodiment of the invention.

Returning to FIG. 21, in step 324 a determination is made as to whether all angles of the panoramic image room(n) have been compared to the floorplan image at point(i), and a cost calculated for each angle. As discussed above, the panoramic image can be rotated. When a panoramic image is rotated, the relative positions of the detected objects stay the same with respect to one another, but the objects themselves can translate or shift to the left or right. Thus, when comparing a panoramic image room(n) to a floorplan image as shown in FIG. 22, shifting the object locations to the left or right could change the distance between objects in the panoramic image and the floorplan image and can therefore change the determined cost.

This shift in object location to the left or right can be thought of as rotating a user's viewpoint or rotating the orientation of the panoramic image. The angles of the panoramic image can be separated into 10° increments, for example, or into larger or smaller increments, as discussed above with respect to FIGS. 15A and 15B. For small increments of rotation, more processing is required, but a closer match between objects in the panoramic image and objects in the floorplan image can be made more likely. For large increments of rotation, less processing is required, but a closer match between objects in the panoramic image and objects in the floorplan is less likely.

For example, if the panoramic image room(n) is a 360° image and broken up into 10° increments, then 36 different comparisons between the panoramic image room(n) and the segmented floorplan point(i) will need to be performed.

If all the panoramic image angles have not been compared to the floorplan image at point(i), then in step 326, the panoramic image is rotated, for example by 10°, and the process returns to step 322. If all the panoramic image angles have been compared to the floorplan image at point (n), then the process proceeds to step 328.

In step 328 a determination is made as to whether all of the classes of objects have been evaluated. As discussed earlier, a class of an object could be a door, window, corner, etc. Each class of object in a panoramic image and a floorplan image are evaluated separately, so that doors in a panoramic image are compared with doors in a floorplan image, windows in a panoramic image are compared with windows in a floorplan image, corners in a panoramic image are compared with corners in a floorplan image, etc.

If all the classes of objects have not been evaluated, then a new class of object is chosen by incrementing the object class(o) by 1, in step 330. The process then rejoins to step 320 and proceeds from that point. If all the classes of objects have been evaluated, then the process proceeds to step 332. It is noted that not all the classes of objects need to be evaluated. For example, if there are 10 classes of objects, it is possible that only 1 or two classes of objects need to be evaluated. For example, if there are 10 classes of objects, but 95% of the detected objects fall into a first class or a second class, then the other classes may not need to be evaluated as they may not add much to the overall determination of matching a panoramic image and orientation to a point in the floorplan image. This would reduce the computational power required by the computer system 1510. It is also possible that more classes need to be evaluated than a first and second class. For example, each evaluated class can add precision the location and orientation where the panoramic image was determined to be taken.

In step 332, a determination is made as whether to calculate an additionalpoint(i) in the floorplan image. One method of determining if distances for additional points(i) in the floorplan image needed to be calculated, would be to calculate a cost gradient for several points(i) in the floorplan image and then determine a local minimum cost based on the several points. For example, after calculating a cost at a starting point(i), costs for adjacent points(i) could also be calculated. Looking at these costs together, a cost gradient could be created. Using the cost gradient, a local minimum cost could be found and no additional points(i) would need to be calculated once the local minimum was found. It is noted that the more points(i) are calculated, the higher degree of certainty can be achieved in determining the local minimum cost.

It is noted that the above calculated cost gradient is for a particular room or area in the floorplan image. However, this process of calculating a cost gradient be repeated for one or more, or all of the rooms areas in the floorplan image. For example, as shown in FIGS. 11A and 11B, if the first location or room in the floorplan image to be compared against was room A, then the next location to be compared against would be room B, and then room C and so on until each room or area in the floorplan image was compared against each panoramic image.

Another method of determining if costs for additional points(i) in the floorplan image need to be calculated would be to use the locations from the distance transform data as a stalling point. That is, the starting point could be the central location in the room, according to the distance transform data. A cost calculation at a random Gaussian sample of points(i), located around the starting point, could then be performed. As the starting point is a likely candidate for producing a small cost, and the surrounding points are the next mostly likely points to produce a small cost. This method takes advantage of a likely desired location when taking a panoramic image, namely, near the center of the area photographed. Once all of the distances for the points(i) in the random Gaussian sample are calculated, the point(i) with the smallest cost can be used.

If an additional point(i) is to be calculated, the point(i) is incremented in step 334. As discussed above, the next point calculated could be of a random Gaussian distribution of points(i) around a starting point or could be a nearby point when trying to ascertain a cost gradient. If no additional point(i) is to be calculated, then the process proceeds to step 336.

It is noted that the above calculated cost is for a particular room or area in the floorplan image. However, this process of calculating a cost could be repeated for one or more, or all of the rooms areas in the floorplan image. For example, as shown in FIGS. 11A and 11B, if the first location or room in the floorplan image to be compared against was room A, then the next location to be compared against would be room B, and then room C and so on until each room or area in the floorplan image was compared against each panoramic image.

In step 336 a final determination made as to which location each panoramic image was taken and which orientation the panoramic image was taken at. This determination is made by analyzing the individual costs for each panoramic image and floorplan point and determining which combination of panoramic image and points in the floorplan have a total global minimum cost. This is similar to the analysis as shown in the distance matrix of FIG. 20. A cost for each panoramic image and each floorplan point is evaluated to find the set of panoramic images and floorplan points with the lowest total cost.

Using FIG. 20 as an example, instead of the matrix showing an edit distance score, the matrix would provide a cost for each floorplan image and panoramic image room pair. The panoramic images are numbered 1-9 and shown in the x-axis while the floorplan locations are numbered 1-9 and shown in the y-axis. Each of the numbers in the matrix shows a total cost for the corresponding panoramic image and floorplan location. Further, the numbers in the matrix show the lowest cost for each panoramic image set. That is, the matrix shows the lowest edit distance when accounting for the optimal rotation of the image. From the matrix, the combination of pairings (floorplan location and panoramic image) that has the lowest cost can be determined.

Additionally, the matching angle for each location is also shown at the bottom of the cost matrix. The matching angle is shown for each of the panoramic images 1-9. That is, the matching angle for the first panoramic image is 190°, the matching angle for the second panoramic image is 90°, the matching angle for the third panoramic image is 90°, and so on. This angle indicates the number of degrees the panoramic image must be rotated to have the best match and lowest cost.

A visual representation of matching the panoramic images with a corresponding location in the floorplan is illustrated in the bipartite graph in FIG. 17. As shown in FIG. 17, panoramic images 30, 32, 34, 36 38 and 39 are shown with lines connecting them to different floorplan locations, A through I. These lines represent the lowest costs between a panoramic image and a floorplan location. As discussed above, the panoramic image and locations pairings with the overall lowest costs can be paired together to correspond a panoramic image with a location in a floorplan image.

Figure 24:
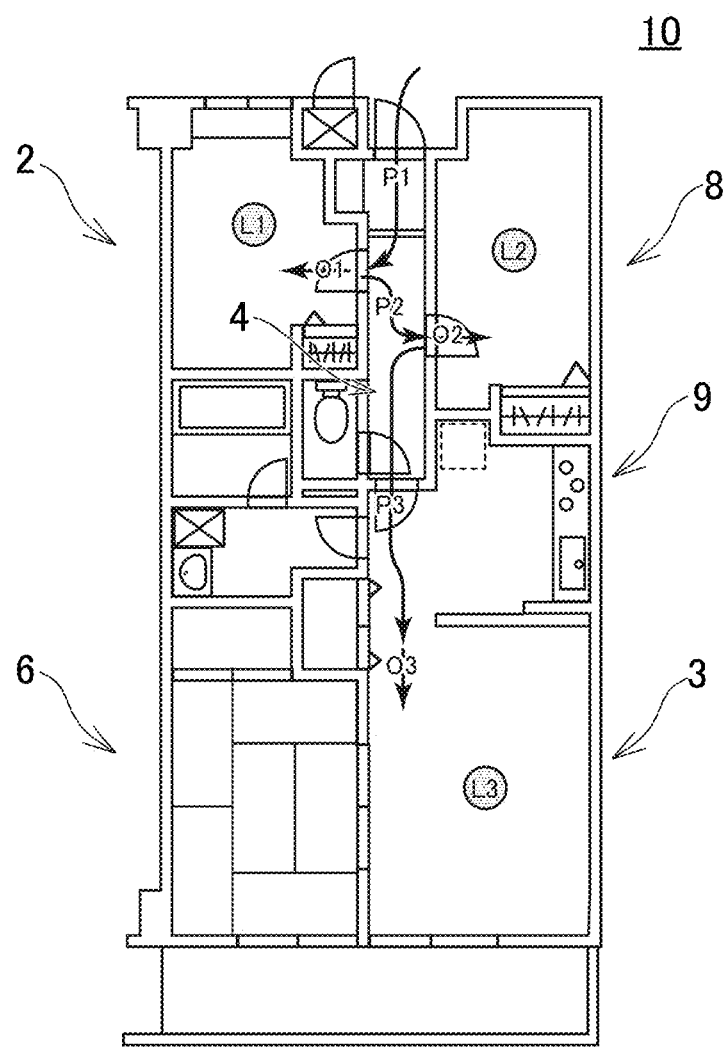
FIG. 24 shows a path of a virtual tour.

FIG. 24 shows a simplified side view of a room 2400, with a door 2402. The door 2402 has a total height H. The height H is the sum of height $H_1$ and $H_2$. $H_1$ is the height of a digital camera 2420 when a panoramic image of the room was taken. As discussed above, the digital camera 2420 can be estimated to have a field of view 70°. Dividing this field of view by two, yields the angle θ, which is therefore 35°.

Creating Virtual Tour

Once each of the panoramic images is matched to a location in the floorplan image and an orientation of each panoramic image has been determined, a virtual tour can be created. In the virtual tour, it is preferable to orient the panoramic images consistent with how a user would naturally move through the property. For example, if a user walks through a door in the virtual tour, or goes from one location to an adjacent location, the orientation of the panoramic image should be in a direction which the user traveled; i.e. through the door or adjacent location. This is because the user could become disoriented if the expected viewpoint, when moving from one location of the floorplan to the next, is not consistent with the user's expectation.

To have a consistent orientation, the panoramic image can be rotated or adjusted, so that the correct orientation will be presented to the user when entering the specific room. For example, if the user goes from the west balcony to the tatami room, as shown in FIG. 5, the panoramic image of the tatami room can be oriented so that the user is looking straight ahead, as if she/he just entered the tatami room in the actual property. As each panoramic image has an orientation with respect to the floorplan image, each panoramic image can be rotated accordingly so that the correct orientation is presented to the user as discussed above.

For example, if the panoramic image is pointing in a 0° direction but needs to point in a 270° direction to match with the user's expectation, the panoramic image can be rotated accordingly and presented in the virtual tour with the panoramic image facing in the 270° direction. Further, the panoramic image can be cropped or otherwise edited to reduce the field of view from 360° to a more normal field of view, such as 90° for example. Additionally, the field of view could be edited so that it matches a field of view of a person located in the particular position.

The virtual tour can be created in a number of ways. For example, the virtual tour could be automatically played by the computer system 1510, taking the user on a predefined tour of the property. The virtual tour could include stopping in all the rooms that have panoramic images associated with them. Further, the virtual tour could have the panoramic image for a room rotated or panned when in a room, so as to show the entire room to the user.

Additionally, the virtual tour could be interactive, allowing the user to choose which locations are visited and in which order. The virtual tour could also allow the user to determine how long to stay in a location in the floorplan.

FIG. 24 shows an example of a three-room tour of floorplan 10. In this example, floorplan 10 is the same floorplan as discussed previously, and like reference characters represent the same features.

Before the virtual tour begins, panoramic images taken at a property, along with a floorplan image of the property have already been input into the computer system 1510. Using any of the embodiments discussed above, each panoramic image is matched with a location of where the panoramic image was taken in the floorplan image. Further, an orientation of each panoramic image is also determined with respect to the floorplan image. With this information, the computer system 1510 can create a virtual tour of the property. The virtual tour can encompass one or more rooms of the floorplan image that have associated panoramic images. An example of a virtual tour is discussed below with respect to FIG. 24.

In FIG. 24, starting from the entry door, the virtual tour begins at path P1 and enters room 2. The corresponding panoramic image taken in room 2 is given an orientation of O1 which is the same orientation of the user entering room 2. The corresponding panoramic image is therefore aligned so that the center of the image is oriented in the O1 direction when the user enters the room. It is important to remember that the entire field of view may not be shown to the user in one single frame. That is, the panoramic image can be cropped or otherwise adjusted so that a smaller and more natural field of view is shown to the user. Further, this field of view could also be the same or similar field of view that the user could see when at the specified location in the room 2.

Further, the location L1 is the location where it was determined that the panoramic image was taken. Thus, the virtual tour would orient the panoramic image in the O1 direction, at the L1 location. The user could then pan left or right to view the rest of the room, or this could be done automatically by the computer system. Concurrently, a map of where the user is in the floorplan image can also be shown to aid the user.

Next, the example virtual tour would go to the adjacent room 8, as shown by path P2. The orientation of the panoramic image would be that shown by orientation O2. And the location of the panoramic image is shown be location L2.

Finally, the virtual tour would take the user to the living room 3, as shown by path P3. Again, the orientation would be that of O3 and the location is shown by L3.

A virtual tour is not limited to three rooms and the virtual tour can visit each room or space which has a corresponding panoramic image associated with it, and/or can be directed by the user where to visit.

Hardware:

FIG. 25 illustrates an example of devices that can run the computing system of the present invention. The computing system can be implemented on a computer, mobile device or any processing platform. The computing system can run in website browsers, mobile phone applications, large scalable networks, etc. The computing system can also include one or more CNNs in order to perform the image processing, as discussed above.

FIG. 25 is a diagram of example components of four computing systems 1510 which may be used to implement one or more aspects of the adapted to analyze images and create a virtual tour, as described herein. Together, these four computing systems are networked to form a networked computing system 1500. It is noted that one or more computing systems 1510 can be used to implement various aspect of the invention, or the entire invention. When a computing system 1510 is referred to, it can mean a single computing system, such as 1510A, or multiple computing systems, such as networked computing system 1500.

Various computing systems may be used to implement the systems and methods described in this document, as either a client or as a server or plurality of servers. Computing systems are intended to represent various forms of digital computers, such as laptops, desktops, workstations, personal digital assistants, servers, blade servers, mainframes, and other appropriate computers. Other computing systems may include various forms of mobile devices, such as personal digital assistants, cellular telephones, smartphones, and other similar computing systems. The components shown here, their connections and relationships, and their functions, are meant to be examples only, and are not meant to limit embodiments of the inventions described and/or claimed in this document.

Each of the components of the computing systems 1510 are interconnected using various busses and may be mounted on a common board or in other manners as appropriate. The processor can process instructions for execution within the computing device, including instructions stored in the memory or on the storage device to display graphical information on a display. The output of the computing system 1510 may be shown on a display, transmitted to another computing device, used in a three-dimensional rendering, used in another machine, etc. In other embodiments, multiple processors and/or multiple buses may be used, as appropriate, along with multiple memories and types of memory. Also, multiple computing systems may be interconnected, with each device providing portions of the necessary operations (e.g., as a server bank, a group of blade servers, or a multi-processor system).

The processor may be implemented as a chipset of chips that include separate and multiple analog and digital processors. Additionally, the processor may be implemented using any of several architectures. For example, the processor may be an x86 processor, RISC (Reduced Instruction Set Computers) processor. The processor may coordinate with the other components of the device, such as control of user interfaces, applications run by the device, and wireless communication. Multiple processors or processors with multiple cores may also be used. The processor is primarily responsible for performing the functions discussed in this document. However, a GPU may also be used, especially with respect to the image processing aspects of the invention and other aspects that are more efficiently performed in a parallel processing manner. For example, detecting objects within the panoramic and floorplan images can be performed by a CNN. Much of the image processing of a CNN may be performed on a GPU, while other non-image processing related tasks can be performed by the CPU.

The processor may communicate with a user through a control interface and display interface coupled to a display. The display may be, for example, an LED (Liquid Crystal Display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

In general, deeper CNN's with more parameters perform better on computer systems with high processing power and a large amount of cache memory. Computer systems with a large amount of parallel processing power, such as GPU's, tend to be much faster than single processors. GPU's are discussed in more detail below.

Specifically, in image processing applications a GPU (Graphic Processing Unit) that is computationally more powerful than a CPU may be used. In practice a set of 10's, 100's or 1000's of GPUs can be used to more quickly compute the vast amount of information. A GPU typically includes processors and a common memory. The processors respectively acquire data efficiently from the common memory and perform arithmetic processing by executing a common program. An example of a GPU that can be used is a GeForce 1080 GPU.

Multiple computing systems 1510A, 1510B, 1510C and 1510D are shown. The computing system 1510 is not limited to this specific configuration but may be a single computer or many computers. Likewise, the computing system 1510 may include multiple parallel CPU's GPU's or a combination thereof. The computing system 1510 can include a CPU 1520, memory 1550, communication unit 1530, parallel computing device 1560, and a bus 1540. The computing system 1510 may also have a display, not shown, which outputs a result, which can be in the form of an image(s) (e.g. virtual tour).

Input to the computing system 1510 may be done with a personal computer, server, or other computing device 1590.

The CPU 1520 operates according to a program stored in memory 1550. The CPU 1520 controls the communication unit 1530 and the parallel computing device 1560. The program may be provided through the network 1580 such as the Internet or provided by being stored in a computer-readable information storage medium such as a DVD-ROM or a USB memory.

The memory 1550 includes, for example, a memory device such as a RAM or a ROM and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520 and sends the information to other devices.

The bus 1540 is configured to send or receive data with the CPU 1520, memory 1550, the communication unit 1530, and the parallel computing device 1560. For example, the CPU 1520 or memory 1550 is connected to the parallel computing device 1560 through an expansion bus in the bus 1540.

The parallel computing device 1560 is hardware that is efficient at performing a large amount of the same type of the computation by parallel computation. The parallel computing device 1560 is, for example, a GPU. The parallel computing device 1560 includes parallel processors units and an in-device memory. Each parallel execution unit includes plurality of processors, an instruction unit, and a high-speed memory, for example.

Each parallel processor performs floating-point computation and reading or writing data with the in-device memory and the high-speed memory. The instruction unit causes the parallel processor, which are included in the parallel execution unit including the instruction unit, to perform processing based on a program stored in the in-device memory etc. The parallel processor included in one of the parallel execution units process the same instruction according to an instruction from the instruction unit included in such parallel execution unit. In this way, a plurality of parallel processors can be controlled by one instruction unit, thereby suppressing an increase in circuit size of the instruction unit. As such, it is possible to increase the number of the parallel processors included in the parallel computing device 1560 compared to a case of the CPU 1520.

The in-device memory can be composed of a DRAM. The in-device memory is connected to the CPU 1520 and the memory 1550 through the bus 1540. The parallel computing device 1560 also includes a circuit for transferring data between the in-device memory and memory 1550 via a DMA transfer. The high-speed memory is composed of, for example, a SRAM that is capable of higher speed access than the in-device memory. Each of the in-device memory and the high-speed memory is a common memory accessible from the parallel processors of the GPU 1560.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible. Some process steps may be executed in different order from the specific description herein based on, for example, considerations of function, purpose, conformance to standard, legacy structure, user interface design, and the like.

A number of embodiments of the invention have been described. It should be understood that various modifications may be made without departing from the spirit and scope of the invention. For example, various forms of the flows shown above may be used, with steps re-ordered, added, or removed. Also, several embodiments of the invention has been described and it is noted that these embodiments can be combined or modified.

We claim:

1. A computer implemented method using artificial intelligence for matching images with locations and directions, the method comprising:
    acquiring a plurality of room images taken with a camera;
    using artificial intelligence to detect at least one object in each of the plurality of room images;
    detecting an object location of the at least one object detected in each of the room images;
    acquiring a floorplan image;
    using artificial intelligence to detect at least one object in the floorplan image;
    detecting an object location of the at least one object detected in the floorplan image;
    comparing the at least one object and object location detected in each of the plurality of room images to the at least one object and object location detected in the floorplan image; and
    determining a location in the floorplan image where each room image was taken.

2. The method according to claim 1, wherein a determination is made as to how many degrees each room image must be shifted along a horizontal axis so that each room image is aligned in a first orientation with respect to an orientation in the floorplan image.

3. The method according to claim 1, wherein a first room image in the plurality of room images is analyzed using a convolutional neural network to determine a classification of each object and the location of each object.

4. The method according to claim 3, wherein the floorplan image is analyzed using a convolutional neural network to determine the classification of each object and the location of each object in the floorplan image.

5. The method according to claim 1, further comprising:
    performing a distance transform function on the floorplan image to determine the distance between each point in the floorplan image and closest object in the floorplan image.

6. The method according to claim 1, wherein the detected objects are of a class which includes: door, window, corner or wall.

7. The method according to claim 6, wherein the comparing the objects and object locations detected in each of the room images to the objects and object locations detected in the floorplan image, is done using a single class of objects at a time.

8. The method according to claim 7, wherein the comparison between single classes of objects is made by measuring a distance between the objects in the room image and the floorplan image and assigning a cost between objects from a room image and the floorplan image.

9. The method according to claim 8, wherein a weighting factor is used to determine the cost.

10. The method according to claim 1, wherein the comparing of the objects and object locations detected in each of the room images to the objects and object locations detected in the floorplan image, is done for each room image and a plurality of locations in the floorplan image.

11. The method according to claim 1, wherein the comparison between objects is performed using an edit distance.

12. An artificial intelligence (AI) system for matching images with locations and directions, the apparatus comprising a central processing unit (CPU), a graphical processing unit (GPU), and a memory, the CPU configured to:
    acquire a plurality of room images;
    acquire a floorplan image;
    the GPU is configured to:
    detect objects and the object locations in each of the room images;
    detect objects and the object locations in the floorplan image;
    wherein the CPU is further configured to:
    compare the objects and object locations detected in each of the room images to the objects and object locations detected in the floorplan image; and
    determine a location in the floorplan image where each room image was taken.

13. The AI system according to claim 12, wherein the AI system is configured to determine how many degrees each room image must be rotated so that each room image is aligned in a first orientation with respect to an orientation in the floorplan image.

14. The AI system according to claim 12, wherein the GPU implements a convolutional neural network to determine a classification of each object and the location of each object for a first room image in the plurality of room images.

15. The AI system according to claim 14, wherein the GPU implements a convolutional neural network to determine a classification of each object and the location of each object for the floorplan image.

16. The AI system according to claim 12, wherein the CPU or GPU is further configured to perform a distance transform function on the floorplan image to determine the distance between each point in the floorplan image and closest object in the floorplan image.

17. The AI system according to claim 12, wherein the detected objects have classes which include: door, window, corner or wall.

18. The AI system according to claim 17, wherein the CPU or GPU is further configured to compare the objects and object locations detected in each of the room images to the objects and object locations detected in the floorplan image, is done using a single class of objects at a time.

19. The AI system according to claim 18, wherein the CPU or GPU is further configured to, when comparing between single classes of objects, determine a distance between the objects in the room image and the floorplan image, and assigning a cost between objects from a room image and the floorplan image.

20. A non-transitory computer readable medium for causing an artificial intelligence (AI) system, which comprises a central processing unit (CPU), a graphical processing unit (GPU), and a memory, to match images with locations of where the images were taken and directions the images were taken in, the non-transitory computer readable medium causing the AI system to:
  acquire a plurality of room images;
  acquire a floorplan image;
the non-transitory computer readable medium causing the GPU to:
  detect objects and the object locations in each of the room images;
  detect objects and the object locations in the floorplan image;
wherein the non-transitory computer readable medium further causes the CPU to:
  compare the objects and object locations detected in each of the room images to the objects and object locations detected in the floorplan image; and
  determine a location in the floorplan image where each room image was taken.

* * * * *